(12) United States Patent
Idreos et al.

(10) Patent No.: US 11,675,694 B2
(45) Date of Patent: Jun. 13, 2023

(54) KEY-VALUE STORES WITH OPTIMIZED MERGE POLICIES AND OPTIMIZED LSM-TREE STRUCTURES

(71) Applicants: Stratos Idreos, Cambridge, MA (US); Niv Dayan, Somerville, MA (US)

(72) Inventors: Stratos Idreos, Cambridge, MA (US); Niv Dayan, Somerville, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 133 days.

(21) Appl. No.: 17/376,827

(22) Filed: Jul. 15, 2021

(65) Prior Publication Data

US 2021/0342259 A1 Nov. 4, 2021

Related U.S. Application Data

(63) Continuation of application No. 16/963,411, filed as application No. PCT/US2019/014493 on Jan. 22, 2019, now Pat. No. 11,151,028.

(60) Provisional application No. 62/619,957, filed on Jan. 22, 2018.

(51) Int. Cl.
  *G06F 12/02* (2006.01)
  *G06F 16/22* (2019.01)
  *G06F 16/17* (2019.01)

(52) U.S. Cl.
  CPC ...... *G06F 12/0238* (2013.01); *G06F 16/1734* (2019.01); *G06F 16/2246* (2019.01); *G06F 2212/7202* (2013.01)

(58) Field of Classification Search
  None
  See application file for complete search history.

(56) References Cited

U.S. PATENT DOCUMENTS

| | | | |
|---|---|---|---|
| 9,846,711 | B2 | 12/2017 | Borthakur |
| 2014/0279881 | A1 | 9/2014 | Tan et al. |
| 2015/0058568 | A1 | 2/2015 | Fong et al. |
| 2016/0188690 | A1 | 6/2016 | Tan et al. |
| 2016/0334996 | A1 | 11/2016 | Zhong |
| 2017/0249257 | A1 | 8/2017 | Bonnet et al. |

(Continued)

OTHER PUBLICATIONS

International Search Report and the Written Opinion for International Application No. PCT/US2019/014493 dated Apr. 10, 2019, 19 pages.

(Continued)

*Primary Examiner* — Charles Rones
*Assistant Examiner* — Ryan Dare
(74) *Attorney, Agent, or Firm* — Morgan, Lewis & Bockius LLP

(57) ABSTRACT

Embodiments of the invention utilize an improved LSM-tree-based key-value approach to strike the optimal balance between the costs of updates and lookups and storage space. The improved approach involves use of a new merge policy that removes merge operations from all but the largest levels of LSM-tree. In addition, the improved approach may include an improved LSM-tree that allows separate control over the frequency of merge operations for the largest level and for all other levels. By adjusting various parameters, such as the storage capacity of the largest level, the storage capacity of the other smaller levels, and/or the size ratio between adjacent levels in the improved LSM-tree, the improved LSM-tree-based key-value approach may maximize throughput for a particular workload.

24 Claims, 16 Drawing Sheets

(56) References Cited

U.S. PATENT DOCUMENTS

2020/0250148 A1 8/2020 Dayan
2021/0157746 A1 5/2021 Lee

OTHER PUBLICATIONS

Sears et al. "bLSM a general purpose log structured merge tree." In: Proceedings of the 2012 ACM SIGMOD International Conference on Management of Date. May 24, 2012, 12 pages.

| TERM | DESCRIPTION | UNIT |
|---|---|---|
| $N$ | TOTAL NUMBER OF ENTRIES | ENTRIES |
| $L$ | NUMBER OF LEVELS | LEVELS |
| $L_{max}$ | MAXIMUM POSSIBLE NUMBER OF LEVELS | LEVELS |
| $B$ | NUMBER OF ENTRIES THAT FIT INTO A STORAGE BLOCK | ENTRIES |
| $P$ | SIZE OF THE BUFFER IN STORAGE BLOCKS | BLOCKS |
| $T$ | SIZE RATIO BETWEEN ADJACENT LEVELS | |
| $T_{lim}$ | SIZE RATIO AT WHICH $L$ CONVERGES TO 1 | |
| $M$ | MAIN MEMORY ALLOCATED TO THE BLOOM FILTERS | BITS |
| $p_i$ | FALSE POSITIVE RATE FOR BLOOM FILTERS AT LEVEL i | % |
| $s$ | SELECTIVITY OF A RANGE LOOKUP | % |
| $R$ | ZERO-RESULT POINT LOOKUP COST | I/Os |
| $V$ | NON-ZERO-RESULT POINT LOOKUP COST | I/Os |
| $Q$ | RANGE LOOKUP COST | I/Os |
| $W$ | UPDATE COST | I/Os |
| $K$ | BOUND ON NUMBER OF RUNS AT LEVELS 1 TO $L$ - 1 | RUNS |
| $Z$ | BOUND ON NUMBER OF RUNS AT LEVEL $L$ | RUNS |
| $\mu$ | STORAGE SEQUENTIAL OVER RANDOM ACCESS SPEED | |
| $\phi$ | STORAGE WRITE OVER READ SPEED | |

FIG. 1B

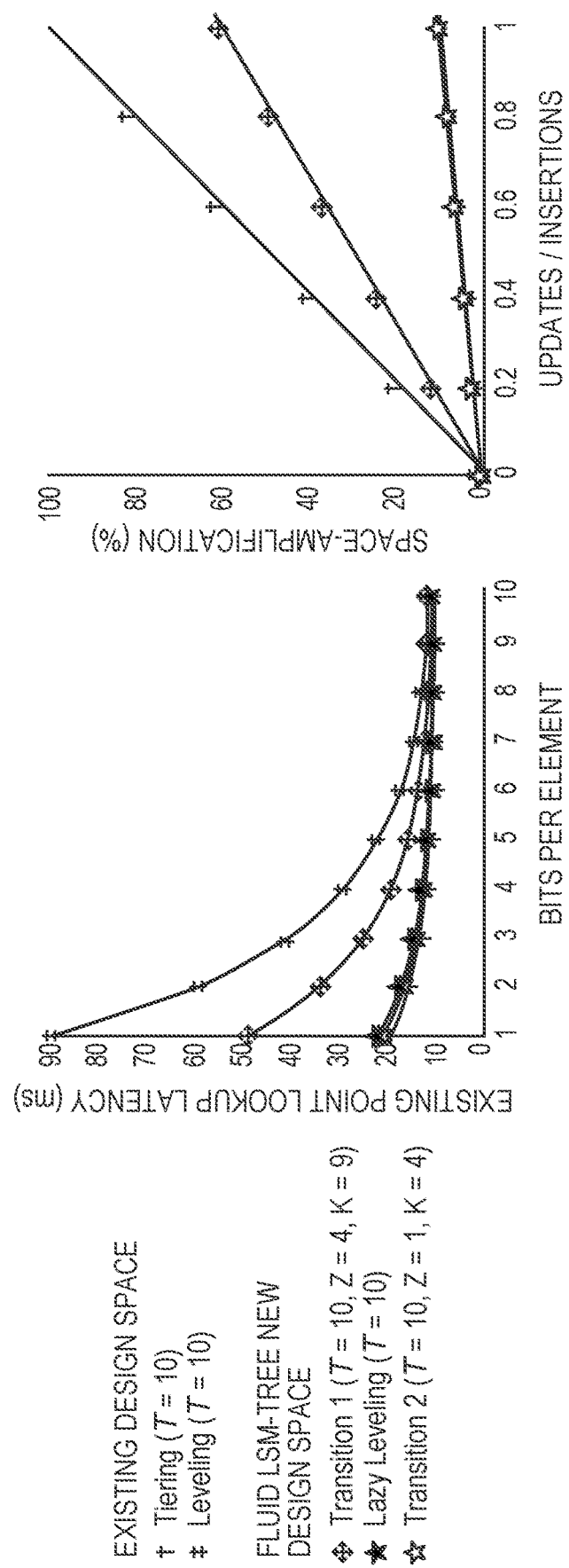

KEY-VALUE STORES WITH OPTIMIZED MERGE POLICIES AND OPTIMIZED LSM-TREE STRUCTURES

CROSS-REFERENCE TO RELATED APPLICATION

This application is a continuation of U.S. Ser. No. 16/963,411, filed Jul. 20, 2020, which is a U.S. National Phase Application of PCT/US2019/014493, filed Jan. 22, 2019, which claims priority to, and the benefit of, U.S. Provisional Patent Application No. 62/619,957, filed on Jan. 22, 2018. The entire disclosures of these priority documents are hereby incorporated by reference.

GOVERNMENT FUNDING

The present invention was supported in part by grant no. U.S. Pat. No. 1,452,595 from the National Science Foundation. The U.S. Government has certain rights in the invention.

FIELD OF THE INVENTION

The field of the invention relates, generally, to key-value stores and, more particularly, to the key-value stores involving a log-structured merge-tree (LSM-tree) based data structure.

BACKGROUND

Very large data stores, such as those that support business intelligence and "big data" applications, are often organized as key-value stores. Unlike the more common "transactional" databases used for routine business applications, key-value stores are designed to quickly retrieve indexed data items. Because of their size, key-value stores may utilize a hierarchy of storage options reflecting the trade-off between access speed and cost per bit of storage. Given a large dataset that receives frequent additions ("writes") and the need to index that dataset to support queries, it can be challenging to organize the tiers of available storage for optimum efficiency and performance.

The log-structured merge-tree (or LSM-tree) is a data structure with performance characteristics that make it attractive for providing indexed access to files with high insert volume. LSM-trees, like other search trees, maintain key-value pairs, i.e., sets of two linked data items: a key, which is a unique identifier for some item of data, and the value, which is either the data that is identified or a pointer to the location of that data. LSM-trees maintain data in two or more separate structures, each of which is optimized for its respective underlying storage medium; data is synchronized between the two structures efficiently, in batches. More specifically, LSM-trees cascade data over time from smaller, higher performing (but more expensive) storage facilities to larger, slower and less expensive facilities. The LSM-tree later sort-merges "runs"—i.e., arrays of key-value pairs sorted by key and stored in main memory in order to (1) remove obsolete entries to reclaim space, and (2) bound the number of runs that a lookup has to probe. Runs are organized into levels of exponentially increasing sizes. A "point lookup" starts from the smallest level and searches the runs, terminating when it finds the target key, whereas a "range lookup" accesses the relevant key range across all runs at all levels to form a complete result.

To speed up lookups on individual runs, modern designs maintain two additional data structures in main memory. First, for every run there is a set of fence pointers that contain the first key of every disk page of the run; this allows lookups to access a particular key within a run with just one I/O. Second, for every run there exists a Bloom filter, which probabilistically allows a run to be skipped if it does not contain the target key. (A Bloom filter is a probabilistic data structure used to test whether an element is a member of a set. False positive matches are possible, but false negatives are not—i.e., query returns either "possibly in set" or "definitely not in set." The more elements that are added to the set, the larger the probability of false positives will be.)

LSM-based key-value stores exhibit an intrinsic trade-off among the I/O costs of updates, point lookups, and range lookups, as well as the cost of storage (measured as space amplification, i.e., the amount of storage space occupied by obsolete entries). The reason is that they perform expensive merge operations in order to (1) bound the number of runs that a lookup has to probe, and (2) remove obsolete entries to reclaim space. Given this performance trade-off and the many parameters that can affect it, determining how best to organize storage and retrieval operations to maximize overall performance in a key-value store represents a significant challenge.

SUMMARY

Embodiments of the present invention provide an improved key-value approach based on LSM-trees, and which facilitates optimizing the trade-off between the I/O cost of updates and lookups as well as storage space for a particular application workload and hardware. The improved LSM-tree key-value approach involves use of a new merge policy (referred to as "lazy leveling" herein) that removes merge operations from all but the largest levels of LSM-tree. In one embodiment, lazy leveling is a hybrid merge policy of a conventional "leveling" merge policy and a conventional "tiering" merge policy—i.e., lazy leveling applies leveling at the largest level and tiering applies at all other levels. As a result, there is only one run at the largest level, and whenever a new run is added to the largest level, the runs are merged into a single run; whereas, runs at each of the other levels (i.e., all levels except for the largest one) may be merged within the level only when the level reaches capacity. Lazy leveling may advantageously improve the worst-case complexity of update cost while maintaining the same bounds on point lookup cost, long range lookup cost and storage space.

In some embodiments, the improved LSM-tree key-value approach also includes an improved LSM-tree (referred to as "Fluid LSM-tree" herein) that allows separate control over the frequency of merge operations for the largest level and for all other levels; this may allow switching between and/or combination of different merge policies across the entire LSM-tree design space. In one embodiment, the improved LSM-tree is combined with lazy leveling to provide maximal throughput for a particular application workload and hardware. For example, the combination may tune various parameters, such as the storage capacity of the largest level, the storage capacity of the other smaller levels, and/or the size ratio between adjacent levels in the improved LSM-tree, to maximize the throughput for a particular workload. In one implementation, parameter tuning is subject to a user constraint on space amplification specifying the maximum amount of storage space that may be occupied by obsolete files.

Accordingly, in one aspect, the invention pertains to a database system including a main memory having volatile storage and including a file buffer; the secondary store having nonvolatile storage for storing files; memory containing a log-structured merge-tree (LSM-tree) providing indexed access to files stored in the file buffer and the secondary store, the LSM-tree being organized to accommodate a range of merge policies; and a processor configured to perform memory-access runs, each run specifying one or more files to be written from the file buffer to the secondary store and one or more files to be retrieved from the secondary store to the file buffer. In some embodiments, each of the runs is sorted and has a size; the runs are organized into multiple levels according to the run size; a largest one of the levels has a storage capacity of Z runs; the other levels have a storage capacity of K runs; the unitary size ratio is T; Z, K, and T are integers greater than 1; and the processor is further configured to select values for T, K and Z to maximize throughput. In one implementation, the processor selection of the values for T, K and Z is constrained by a maximum amount of storage space occupied by obsolete files.

In some embodiments, the processor is further configured to determine an update cost, a point-lookup cost, and a range lookup cost based at least in part on the selected values for T, K and Z. In addition, the processor may be further configured to assign a weighting factor to each of the update cost, point-lookup cost, and range lookup cost. In one implementation, the processor is further configured to determine the throughput based at least in part on the update cost, point-lookup cost, and range lookup cost and the weighting factors assigned thereto. Additionally, the processor may be further configured to determine the throughput based at least in part on a worst-case time to read a block from the secondary store. The throughput may be an inverse of the worst-case time and an inverse of the update cost, point-lookup cost and range lookup cost weighted by their associated weighting factors; the update cost may specify a I/O cost of modifying a file in the secondary store or the file buffer; the point lookup cost may specify a cost of retrieving the most recent version of a file from the secondary store or one of the files in the file buffer; and the range lookup cost may specify a cost of retrieving, from the secondary store or one of the files in the file buffer, the most recent version of a file having a key within a specified range. In some embodiments, the main memory further includes multiple Bloom filters, each associated with a run; the processor is then further configured to allocate a memory budget among the Bloom filters to minimize the point-lookup cost. The processor may be further configured to assign a false positive rate to the Bloom filter at each level based at least in part on a number of entries in the corresponding run, and minimize the point-lookup cost by (i) defining a memory budget, (ii) determining false positive rates of the Bloom filters that minimize the point-lookup cost given the defined memory budget, and (iii) assigning the determined false positive rates to the Bloom filters.

In another aspect, the invention relates to a method for providing an improved key-value storing system. In various embodiments, the method includes providing a main memory having volatile storage and including a file buffer; providing the secondary store including nonvolatile storage for storing files; providing memory containing a log-structured merge-tree (LSM-tree) having indexed access to files stored in the file buffer and the secondary store, the LSM-tree being organized to accommodate a range of merge policies; and performing memory-access runs, each run specifying one or more files to be written from the file buffer to the secondary store and one or more files to be retrieved from the secondary store to the file buffer. In some embodiments, each of the runs is sorted and has a size; the runs are organized into multiple levels according to the run size; a largest one of the levels has a storage capacity of Z runs; the other levels have a storage capacity of K runs; the unitary size ratio is T; Z, K, and T are integers greater than 1; and the values for T, K and Z are selected to maximize throughput. In one implementation, selection of the values for T, K and Z is constrained by a maximum amount of storage space occupied by obsolete files.

In some embodiments, the method further includes determining an update cost, a point-lookup cost, and a range lookup cost based at least in part on the selected values for T, K and Z. In addition, the method may further include assigning a weighting factor to each of the update cost, point-lookup cost, and range lookup cost. In one embodiment, the method further includes determine the throughput based at least in part on the update cost, point-lookup cost, and range lookup cost and the weighting factors assigned thereto. Additionally, the method may further include determining the throughput based at least in part on a worst-case time to read a block from the secondary store. The throughput may be an inverse of the worst-case time and an inverse of the update cost, point-lookup cost and range lookup cost weighted by their associated weighting factors; the update cost may specify a I/O cost of modifying a file in the secondary store or the file buffer; the point lookup cost may specify a cost of retrieving the most recent version of a file from the secondary store or one of the files in the file buffer; and the range lookup cost may specify a cost of retrieving, from the secondary store or one of the files in the file buffer, the most recent version of a file having a key within a specified range. In various embodiments, the main memory further includes multiple Bloom filters, each associated with a run; the method further includes allocating a memory budget among the Bloom filters to minimize the point-lookup cost. The method may further include assigning a false positive rate to the Bloom filter at each level based at least in part on a number of entries in the corresponding run, and minimizing the point-lookup cost by (i) defining a memory budget, (ii) determining false positive rates of the Bloom filters that minimize the point-lookup cost given the defined memory budget, and (iii) assigning the determined false positive rates to the Bloom filters.

Another aspect of the invention relates to a database system including a main memory; the secondary store having nonvolatile storage; memory containing a log-structured merge-tree (LSM-tree) providing indexed access to files stored in the file buffer and the secondary store, the LSM-tree being organized to accommodate a range of merge policies; and a processor configured to access runs in the main memory, each of the runs including multiple key-value pairs sorted by key. In some embodiments, each of the runs is sorted and has a size; the runs are organized into multiple levels according to run size; and the processor is further configured to select a merge policy from multiple alternatives and operate the LSM-tree in accordance with the selected merge policy, the merge policy determining a frequency of merging runs within each of the LSM-tree levels.

In various embodiments, the processor is further configured to select a merge policy based on comparison of an update cost with a lookup cost; the update cost specifies a I/O cost of modifying a file in the secondary store or the file buffer and the lookup cost specifies a cost of retrieving a file from the secondary store or the file buffer. For example, the lookups may be point lookups that find the most recent version of a key-value pair in the secondary store or in one of the runs. Alternatively, the lookups may be range lookups that find the most recent version of key-value pairs within a range in the secondary store or in the main memory. In addition, the merge policy may specify a frequency of merge operations within each of the levels. The processor may be further configured to select a storage capacity for each of the levels; the storage capacities have sizes conforming to a unitary size ratio between successive levels that dictates a frequency at which a level fills up and spills to another level. In one embodiment, the largest one of the levels has a storage capacity of Z runs; the other levels have a storage capacity of K runs; the unitary size ratio is T; K=T−1 and Z=1; and Z, K, and T are integers greater than 1. In another embodiment, the largest one of the levels has a storage capacity of Z runs; the other levels have a storage capacity of K runs; the unitary size ratio is T; $1<K\leq T-1$ and $1<Z\leq T-1$; and Z, K, and T are integers greater than 1.

In yet another aspect, the invention pertains to a method for providing an improved key-value storing system. In various embodiments, the method includes providing a main memory; providing the secondary store including nonvolatile storage; providing memory containing a log-structured merge-tree (LSM-tree) having indexed access to files stored in the file buffer and the secondary store, the LSM-tree being organized to accommodate a range of merge policies; accessing runs in the main memory, each of the runs including multiple key-value pairs sorted by key, each of the runs being sorted and having a size and the runs being organized into multiple levels according to the run size; and selecting a merge policy from multiple alternatives and operate the LSM-tree in accordance with the selected merge policy, the merge policy determining a frequency of merging runs within each of the LSM-tree levels.

In some embodiments, the method further includes selecting a merge policy based on comparison of an update cost with a lookup cost; the update cost specifies a I/O cost of modifying a file in the secondary store or the file buffer and the lookup cost specifies a cost of retrieving a file from the secondary store or the file buffer. The lookups may be point lookups that find the most recent version of a key-value pair in the secondary store or in one of the runs. Alternatively, the lookups may be range lookups that find the most recent version of key-value pairs within a range in the secondary store or in the main memory. In one embodiment, the merge policy specifies a frequency of merge operations within each of the levels. The method further may include selecting a storage capacity for each of the levels; the storage capacities may have sizes conforming to a unitary size ratio between successive levels that dictates a frequency at which a level fills up and spills to another level. In one embodiment, the largest one of the levels has a storage capacity of Z runs; the other levels have a storage capacity of K runs; the unitary size ratio is T; K=T−1 and Z=1; and Z, K, and T are integers greater than 1. In another embodiment, the largest one of the levels has a storage capacity of Z runs; the other levels have a storage capacity of K runs; the unitary size ratio is T; $1<K\leq T-1$ and $1<Z\leq T-1$; and Z, K, and T are integers greater than 1.

Still another aspect of the invention relates to a database system including a main memory having an associated storage cost; the secondary store including nonvolatile storage and having an associated storage cost higher than that of the main memory; memory containing a log-structured merge-tree (LSM-tree) providing indexed access to files stored in the main memory and in the secondary store; and a processor configured to access runs in the main memory, each of the runs including multiple key-value pairs sorted by key. In various embodiments, each of the runs is sorted and has a size; the runs are organized within the secondary store into multiple levels according to the run size; and the processor is further configured to merge all runs within a largest level corresponding to the largest run size into a single run whenever a new run is added to the largest level and at every other level merging runs only from lower levels.

In some embodiments, the processor is further configured to perform updates to memory contents, point lookups to find the most recent version of a stored key-value pair, and range lookups to find the most recent version of all stored key-value pairs within a target key range. The main memory may further include multiple Bloom filters each associated with a run; the processor is then further configured to allocate a memory budget among the Bloom filters to minimize an I/O cost of point lookups. In one implementation, the processor is further configured to assign a false positive rate to the Bloom filter at each level based at least in part on a number of entries in the corresponding run, and minimize the point-lookup cost by (i) defining a memory budget, (ii) determining false positive rates of the Bloom filters that minimize the point-lookup cost given the defined memory budget, and (iii) assigning the determined false positive rates to the Bloom filters.

In another aspect, the invention relates to a method for providing an improved key-value storing system. In various embodiments, the method includes providing a main memory having an associated storage cost; providing the secondary store including nonvolatile storage and having an associated storage cost higher than that of the main memory; providing memory containing a log-structured merge-tree (LSM-tree) having indexed access to files stored in the main memory and in the secondary store; accessing runs in the main memory, each of the runs including multiple key-value pairs sorted by key, each of the runs being sorted and having a size, and the runs being organized within the secondary store into multiple levels according to the run size; and merging all runs within a largest level corresponding to the largest run size into a single run whenever a new run is added to the largest level and at every other level merging runs only from lower levels.

The method may further include performing updates to memory contents, point lookups to find the most recent version of a stored key-value pair, and range lookups to find the most recent version of all stored key-value pairs within a target key range. In addition, the main memory may further include multiple Bloom filters each associated with a run; the method may then further include allocating a memory budget among the Bloom filters to minimize an I/O cost of point lookups. In one implementation, the method further includes assigning a false positive rate to the Bloom filter at each level based at least in part on a number of entries in the corresponding run, and minimizing the point-lookup cost by (i) defining a memory budget, (ii) determining false positive rates of the Bloom filters that minimize the point-lookup cost given the defined memory budget, and (iii) assigning the determined false positive rates to the Bloom filters.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which:

FIG. 1B illustrates a list of terms as used herein;

FIGS. 10A-10H depict performance comparisons of implementing a combination of lazy leveling with Fluid LSM-tree and conventional LSM-tree systems.

DETAILED DESCRIPTION

Embodiments of the present invention relate to an improved LSM-tree key-value approach that may advantageously strike an optimal balance between the I/O costs of updates and lookups as well as storage space-amplification (e.g., the amount of storage space occupied by obsolete entries). The improved LSM-tree key-value approach involves implementation of a new merge policy (lazy leveling) and an improved LSM-tree (Fluid LSM-tree) to switch between and/or combine different merge policies by controlling the frequency of merge operations separately for the largest level and for all other levels in LSM-tree, as further described below.

Technical Terms and Environment

1) LSM Tree

LSM-tree is a data structure that persists an efficient mapping from keys to values in secondary storage. A value is an application object, and a key identifies an application object and enables retrieving it. As used herein, the key-value pairs are referred to as entries and the keys and values are assumed to be stored adjacently. It is also possible to store values separately, e.g., in a log, but this can slow down range lookups as locality is lost.

Figure 1A:
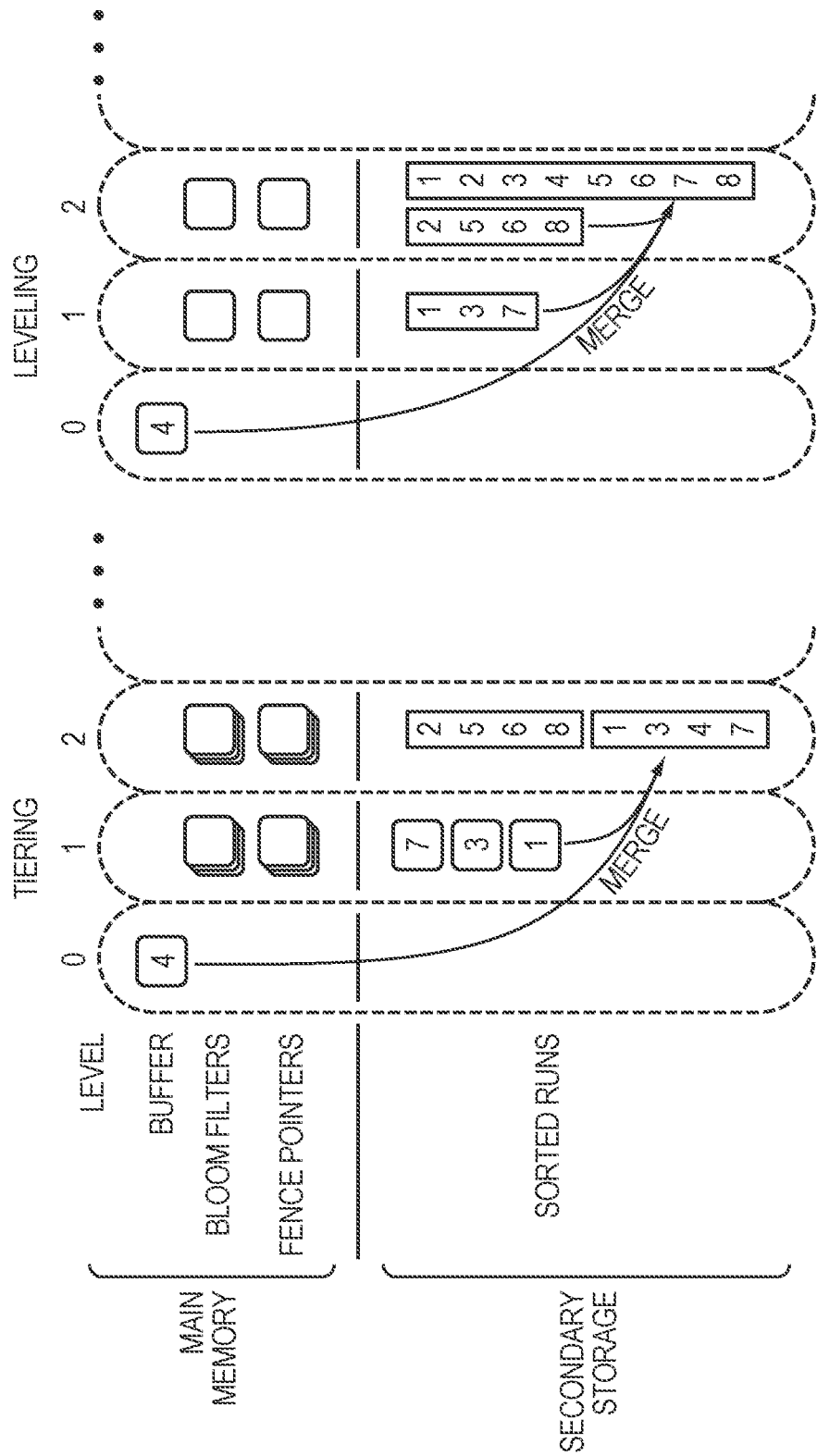
FIG. 1A is an overview of an LSM-tree.

FIG. 1A is an overview of an LSM-tree and FIG. 1B includes a list of terms as used herein. Typically, LSM-tree optimizes for insertions, updates, and deletes (collectively, updates) by initially buffering them in main memory. When the buffer fills up, it flushes to secondary storage (which is typically nonvolatile and therefore slower and cheaper (e.g., disk)) as a sorted run. A "run" specifies one or more file fragments to be written from the buffer to secondary storage and one or more file fragments to be retrieved from secondary storage into the file buffer. (A "file fragment" is a fixed-length contiguous block of memory, such as a page.) In general, runs are first sorted based on age, and then within this order they are organized into levels of exponentially increasing sizes. As further described below, the improved LSM-tree-based key-value approach herein may focus on the size ranking of runs for providing the optimal balance among the I/O costs of updates and lookups and storage space-amplification.

Runs are typically sort-merged in order to bound the number of runs that a lookup has to access in secondary storage and remove obsolete entries (i.e., for which there exists a more recent entry with the same key at a newer run) to reclaim space. Runs may be organized based on their sizes into L conceptual levels: Level 0 is the buffer in main memory, and runs belonging to all other levels are in secondary storage. Generally, there are two merge policies, leveling and tiering, suitable for optimizing the lookups and updates, respectively. With tiering, once Level N gets full, all runs of Level N are merged together into a single run and moved to Level N+1, where now they represent one of the runs of Level N+1. This occurs with leveling as well; but with leveling, when the new run is added to Level N+1, everything in Level N+1 (including what was already there) is merged into a single run immediately, and this keeps happening as new data arrives in Level N+1.

Figure 2:
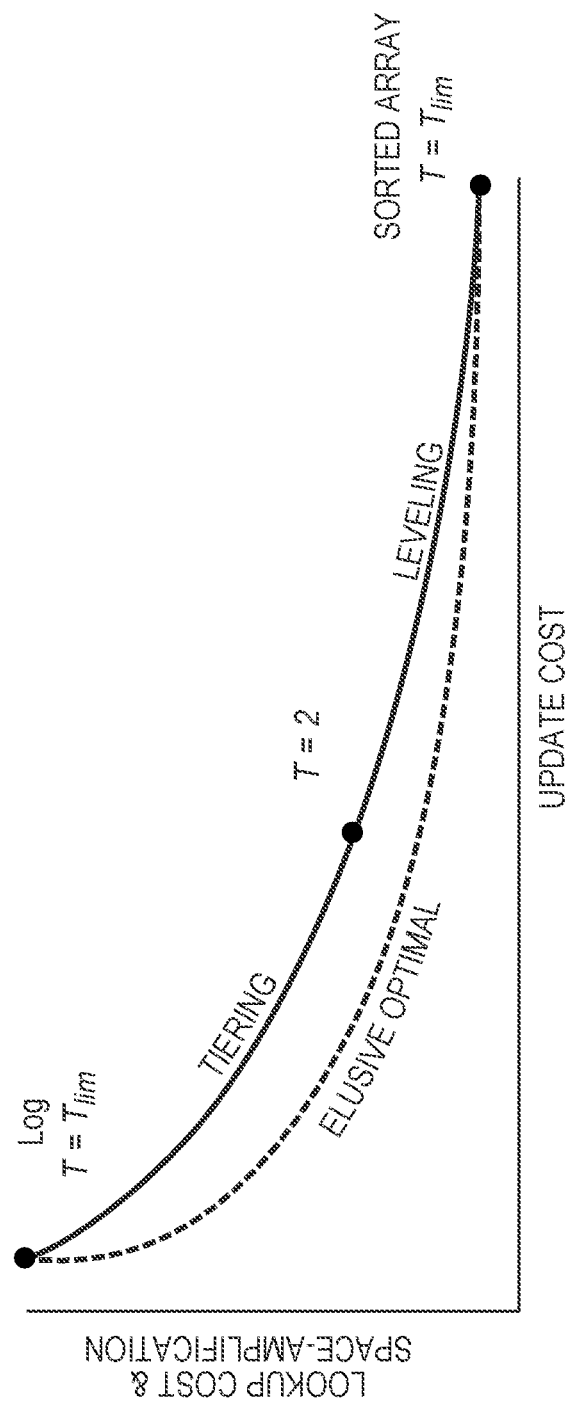
FIG. 2 depicts an LSM-tree design space in accordance with various embodiments.

In various embodiments, the balance between the cost of merging and the cost of lookups is tuned using two "knobs." The first tuning knob is the size ratio T between the capacities of adjacent levels; T controls the number of levels of LSM-tree and thus the overall number of times that runs get flushed and merged across levels. The second tuning knob is the merge policy, which controls the frequency of merge operations within a level. With tiering, runs are merged within a level as sparingly as possible, i.e., only when the level reaches capacity. With leveling, runs are merged within a level as greedily as possible, i.e., whenever a new run comes in. As the size ratio T is increased with leveling, runs get merged more frequently and so lookups become cheaper. On the other hand, as the size ratio T is increased with tiering, runs get merged less frequently and so lookups become more expensive. FIG. 2 illustrates a relationship between the lookup cost and update cost for corresponding values of the merge policy and size ratio. In both cases, the merge is triggered by the buffer flushing and causing Level 1 to reach capacity. With tiering, all runs at Level 1 get merged into a new run that is placed at Level 2. With leveling, the merge also includes the preexisting run at Level 2 to keep the bound on the number of runs at Level 2 at most one.

2) Number of Levels

The buffer at Level 0 has a capacity of B·P entries, where B is the number of entries that fit into a disk page, and P is the size of the buffer in terms of disk pages. In general, Level i has a capacity of $B \cdot P \cdot T^i$ entries, and the capacity at the largest level can be approximated as having $$N \cdot \frac{T-1}{T}$$

entries. The number of levels, L, with respect to the overall number of entries N can then be given by Eq. (1):

$$L = \left\lceil \log_T\left(\frac{N}{B \cdot P} \cdot \frac{T-1}{T}\right) \right\rceil \quad (1)$$

In one embodiment, the size ratio, T, is restricted by setting $2 \leq T \leq T_{lim}$, where $T_{lim}$ is defined as N/(B·P). Thus, as the size ratio increases and approaches $T_{lim}$, the number of levels decreases and approaches 1. Increasing the size ratio beyond $T_{lim}$ has no structural impact. Furthermore, restricting T to be 2 or greater may ensure that the resulting run from a merge operation at level i is never large enough to move beyond level i+1. In other words, this restrain ensures that runs do not skip levels. Thus, the highest possible number of levels $L_{max}$ is $$\left\lfloor \log_2\left(\frac{N}{B \cdot P} \cdot \frac{1}{2}\right) \right\rfloor$$

(occurred when the size ratio is set to 2).

3) Recursive vs. Preemptive Merge

A merge operation recurses to Level i if Levels 0 to i are all at capacity. To avoid recursively copying data from smaller levels multiple times before they get merged into Level i, various embodiments implement a preemptive merge to merge all the contents of Levels 0 to i the next time that the buffer fills up. Referring to FIG. 1A again, both examples of merge operations depicted therein are preemptive as they include runs from across multiple levels.

4) Finding Entries

Since entries are updated out-of-place, multiple versions of an entry with the same key may exist across multiple levels (and even across runs within a level with tiering). To ensure that a lookup is always able to find the most recent version of an entry, various embodiments utilize three measures in LSM-tree: first, when an entry is inserted into the buffer and the buffer already contains an entry with the same key, the newer entry may replace the older one. Second, when two runs that contain an entry with the same key are merged, only the entry from the newer run may be kept as it is more recent. Third, to be able to infer the order at which different entries with the same key across different runs were created, a run may only be merged with the next older or next younger run. Overall, these rules may ensure that if there are two runs that contain different versions of the same entry, the younger run contains the newer version.

5) Point Lookups

A point lookup finds the most recent version of an entry by traversing the levels from the smallest to the largest, and runs within each level from the youngest to the oldest. It terminates when it finds the first entry with a matching key. This entry is the most recent version because if there were a newer version it would have been at a younger run.

6) Range Lookups

A range lookup has to find the most recent versions of all entries within the target key range. It does so by sort-merging the relevant key range across all runs at all levels. While sort-merging, the range lookup identifies entries with the same key across different runs and discards older versions.

7) Deletes

Deletes are supported by adding a one-bit flag to every entry. If a lookup finds that the most recent version of an entry has this flag on, it may not return a value to the application. In addition, when a deleted entry is merged with the oldest run, it is discarded as it has replaced all entries with the same key that were inserted prior to it.

8) Fragmented Merging

To smooth out performance slumps due to long merge operations at larger levels, conventional designs partition runs into files, such as 2 to 64 MB called Sorted String Tables (SSTables) and they merge one SSTable at a time with SSTables with an overlapping key range at the next older run. This approach does not affect the worst-case I/O overhead of merging but only how this overhead gets scheduled across time. For ease of reference, the merge operations herein involve the granularity of runs; it should be understood, however, that the merge operations may also involve the granularity of SSTables.

9) Space Amplification

Space amplification has traditionally not been a major concern for data structure design due to the affordability of disks. The advent of SSDs, however, makes space-amplification an important cost concern (e.g., Facebook has recently switched from B-trees to leveled LSM-trees due to their superior space-amplification properties). Thus, space-amplification is included as a cost metric herein for providing a complete picture of the improved LSM-tree key-value approach described in the present application.

10) Fence Pointers

LSM-tree key-value stores index the first key of every block of every run in main memory to speed up lookups. We refer to these as "fence pointers" (as depicted in FIG. 1A). Formally, the fence pointers take up O(N/B) space in main memory, and they enable a lookup to find the relevant key-range at every run with one I/O.

11) Bloom Filters

To speed up point lookups, in various embodiments, each run includes a Bloom filter in main memory. A Bloom filter is a space-efficient probabilistic data structure used to answer set membership queries. It cannot return a false negative, though it may return a false positive with a tunable false positive rate (FPR). The FPR may depend on the ratio between the number of bits allocated to the filter and the number of entries in the set according to Eq. (2):

$$FPR = e^{-(bits/entries) \cdot \ln(2)^2} \quad (2)$$

A point lookup probes a Bloom filter before accessing the corresponding run. If the filter returns a true positive, the lookup accesses the run with one I/O (e.g., using the fence pointers), finds the matching entry, and terminates. If the filter returns a negative, the lookup skips the run thereby saving one I/O. A false positive may occur, meaning that the lookup wastes one I/O by accessing the run, not finding a matching entry, and having to continue searching for the target key in the next run.

In one embodiment, a Bloom filter is partitioned into smaller equally-sized Bloom filters with an equal division of entries among them, the FPR of each one of the new partitioned Bloom filters is then asymptotically the same as the FPR of the original filter (though slightly higher in practice). For ease of reference, Bloom filters herein are referred to as being non-partitioned, though they can also be partitioned (e.g., per every block of every run) to enable greater flexibility with space management (e.g., Bloom filters for blocks that are not frequently read by point lookups can be offloaded to storage to save memory).

12) Applicability Beyond Key-Value Stores

For ease of reference, the key in the key-value store is assumed to be stored adjacently to its value within a run, and all figures herein depict entries as keys, but they represent key-value pairs. In addition, the improved LSM-tree key-value approach described herein may also apply to applications where there are no values (i.e., the LSM-tree is used to answer set-membership queries on keys), where the values are pointers to data objects stored outside of LSM-tree, or where LSM-tree is used as a building block for solving a more complex algorithmic problem (e.g., graph analytics, flash translation layer design, etc.). The description herein refers to the basic operations and size of LSM-tree so that it can easily be applied to each of these other cases.

Merge Design Space

With more frequent merge operations, lookups become cheaper as there are fewer runs to probe, whereas updates become more expensive as every entry participates in more merge operations. There is therefore an intrinsic trade-off between the amortized cost of updates and the cost of lookups. The two edge points in this space are (i) never merging, meaning the LSM-tree degenerates into a log, and (ii) merging whenever the buffer flushes, meaning the LSM-tree degenerates into a sorted array. LSM-tree may be able to navigate the curve between these two edge points by co-tuning two knobs: the merge policy and the size ratio.

1) Knob 1: Merge Policy

With leveling, merge operations take place as greedily as possible within a level to restrict the number of runs per level to be at most one. As a result, a lookup probes at most $O(1)$ runs per level, and an update participates in at most $O(T)$ merge operations per level before that level is out of capacity. With tiering, on the other hand, merge operations do not take place at all until the level is out of capacity. As a result, a lookup probes at most $O(T)$ runs per level (as a level accumulates at most $T-1$ runs before a preemptive merge is triggered), while an update participates in $O(1)$ merge operations per level. The core difference is that leveling and tiering optimize more for lookups and updates, respectively. The extent to which they optimize for these operations depends on the size ratio T.

2) Knob 2: Size Ratio

The size ratio T determines the capacity of the different levels and thus the frequency at which runs get merged and flushed across levels. When the size ratio T is set to its highest possible value of $T_{lim}$ (meaning that there is only one level), a tiered LSM-tree degenerates into a log, whereas a leveled LSM-tree degenerates into a sorted array. On the other hand, when the size ratio T is set to its lowest possible value of 2, the performance characteristics for leveling and tiered converge, as both the number of runs to probe and to merge at each level (before the level reaches capacity) approach one. As the size ratio increases, lookup cost decreases and update cost increases with leveling, whereas lookup cost increases and update cost decreases with tiering. Hence, co-tuning the size ratio and merge policy enables navigating the whole trade-off continuum.

Improved LSM-Tree Key-Value Approaches

Various embodiments implement one or more of the three approaches further described below to improve the performance of key-value stores.

1) Lazy Leveling: Elimination of Redundant Merging

In various embodiments, a new merge policy (referred to as "lazy leveling" herein) is utilized to eliminate merging at all but the largest level of LSM-tree. This is because merging at the smaller levels may significantly increase update cost while yielding a comparatively insignificant improvement for point lookups, long range lookups, and space-amplification. Relative to leveling, lazy leveling described herein may improve the cost complexity of updates, maintain the same complexity for point lookups, long range lookups, and space-amplification, and provides competitive performance for short range lookups. As a result, this approach enables more scalable performance and space overhead for growing datasets subject to combined workloads. The improved update cost can be traded to reduce point lookup cost and space amplification.

a) Basic Structure

Figure 3:
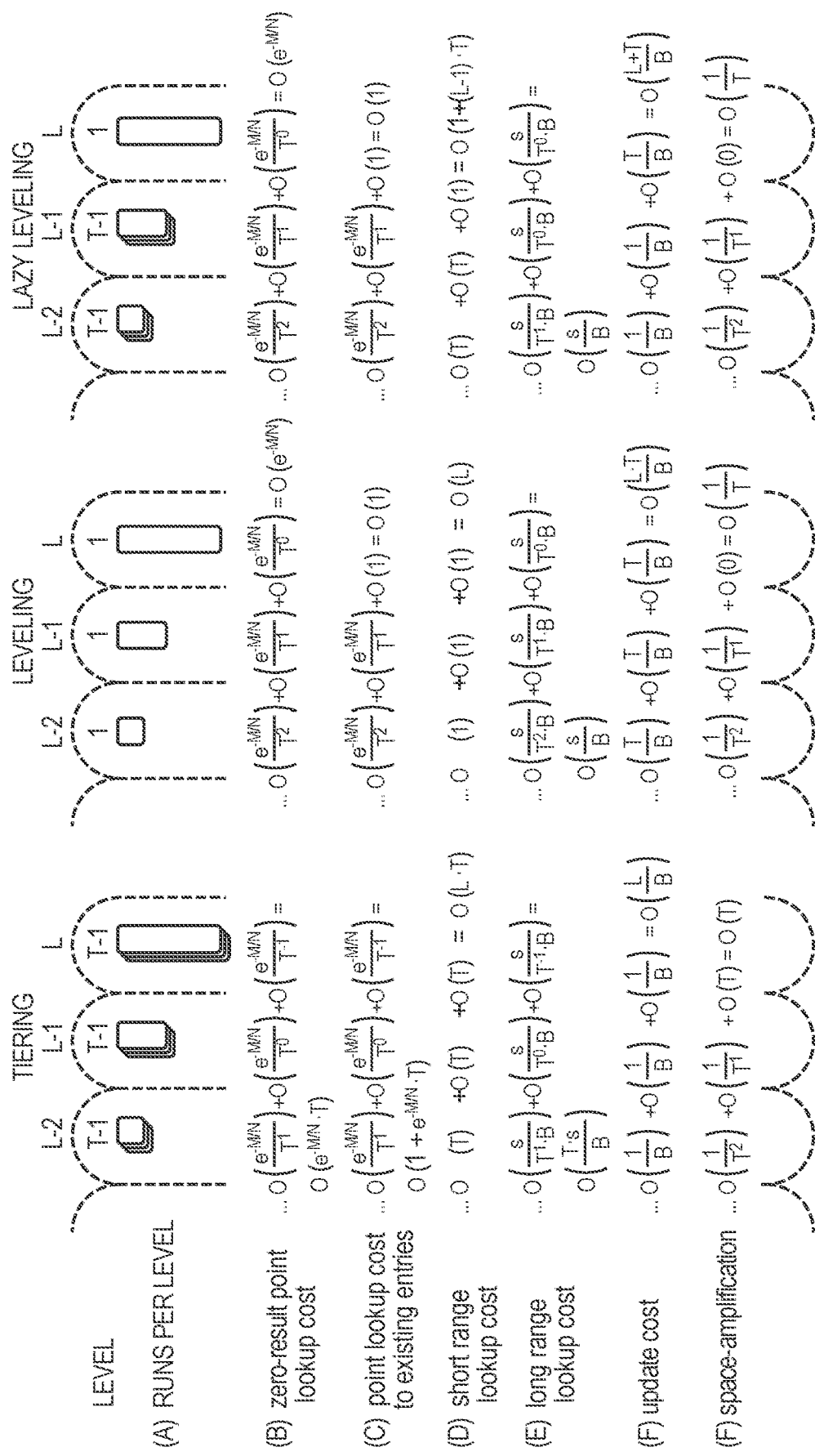
FIG. 3 depicts an exemplary structure and performance characteristics of lazy leveling in accordance with various embodiments.

FIG. 3 depicts an exemplary structure and performance characteristics of lazy leveling in accordance herewith. The top part of FIG. 3 illustrates the structure of the new merge policy, lazy leveling, and compares it to tiering and conventional leveling. In one embodiment, lazy leveling is a hybrid of leveling and tiering: lazy leveling applies leveling at the largest level and tiering at all other levels. As a result, the number of runs at the largest level is 1 and the number of runs at all other levels is at most $T-1$ (i.e., a merge operation may take place before the $T^{th}$ run arrives).

b) Allocation of Bloom Filters

To keep the cost complexity of point lookups fixed despite having more runs to probe at smaller levels, the main memory budget among the Bloom filters across different levels may be optimized. In one embodiment, the optimization is achieved by modeling point lookup cost and the filters' overall main memory footprint with respect to the FPRs and the number of runs across the different levels; these models are then optimized with respect to each other. At a high level, FPRs are based on the number of elements within a run. Generally, this is the same for runs within a level, but it may be different if, for example, there is large variation in entry sizes over time. Accordingly, FPRs are assigned proportionally to a number of entries in a run.

More specifically, the worse-case expected number of wasted I/Os per lookup issued by a zero-result point lookup to runs that do not contain the target key is equal to the sum of false positive rates across all runs' Bloom filters. This cost can be modeled in Eq. (3).

$$R = p_L + (T-1) \cdot \sum_{i=1}^{L-1} p_i \text{ where } 0 < p_i < 1 \quad (3)$$

The additive term $p_L$ corresponds to the FPR for the single run at Level L, and the other term sums up the products of FPRs and number of runs at Levels 1 to $L-1$.

Next, the memory footprint $M_i$ for the Bloom filters at Level i may be modeled with respect to the number of entries $N_i$ and the FPR $p_i$ at that level. This can be performed by rearranging Eq. (2) in terms of bits and applying it to each level. Since the filters at any given level all have the same FPR, Eq. (2) can be directly applied regardless of the numbers of runs at a level. As a result, the memory footprint $M_i$ can be expressed as:

$$M_i = -N_i \cdot \frac{\ln(p_i)}{\ln(2)^2}$$

Then, $N_i$ may be expressed more generally as the product of the capacity at the largest level N·

$$\frac{T-1}{T}$$

and a discounting factor to adjust for the capacity at Level i $$\frac{1}{T^{L-i}}.$$

The memory footprint across all levels may then be summed up to get the overall memory footprint M:

$$M = -\frac{N}{\ln(2)^2} \cdot \frac{T-1}{T} \cdot \sum_{i=1}^{L} \frac{\ln(p_i)}{T^{L-i}} \quad (4)$$

Eqs. (3) and (4) may then be optimized with respect to each other to find the FPRs that minimize point lookup cost R with respect to a given memory budget M:

$$p_i = \begin{cases} R \cdot \frac{T-1}{T}, & \text{for } i = L \\ R \cdot \frac{1}{T^{L-i+1}}, & \text{for } 1 \leq i < L \end{cases} \quad (5)$$

c) Zero-Result Point Lookups

To analyze the cost of zero-result point lookups R with lazy leveling, the optimal FPRs acquired from Eq. (5) may be plugged into Eq. (4); the resulting equation may then be simplified into a closed-form and rearranged in terms of R:

$$R = e^{-\frac{M}{N} \cdot \ln(2)^2} \cdot \frac{T^{\frac{T}{T-1}}}{(T-1)^{\frac{T-1}{T}}} \quad (6)$$

Eq. (6) allows quick determination of the optimal FPRs with respect to a given memory budget M by plugging in the corresponding value of R from Eq. (6) into Eq. (5). In addition, because the multiplicative term at the right-hand side of Eq. (6) is a small constant for any value of T, the complexity of zero-result point lookups is $O(e^{-M/N})$, the same as with leveling despite having eliminated most merge operations.

Figure 4A:
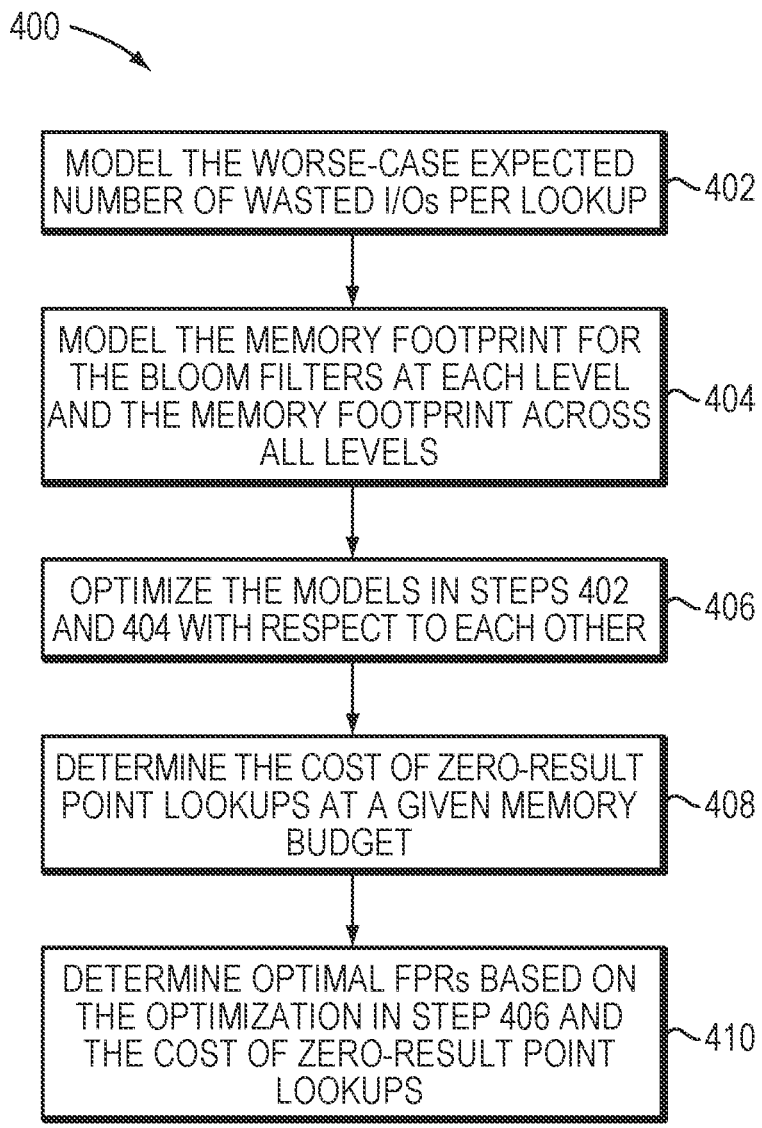
FIG. 4A is a flow chart of an exemplary approach for determining optimal false positive rates associated with Bloom filters across different levels for minimizing the point lookup cost with respect to a given memory budget in accordance with various embodiments.

FIG. 4A is a flow chart of an approach 400 for determining optimal FPRs associated with Bloom filters across different levels for minimizing the point lookup cost with respect to a given memory budget in accordance with various embodiments. In a first step 402, the worse-case expected number of wasted I/Os per lookup is modeled using Eq. (3). In a second step 404, the memory footprint for the Bloom filters at each level and the memory footprint across all levels are modeled using Eq. (4). In a third step 406, the models in step 402 and 404 can be optimized with respect to each other. In a fourth step 408, the cost of zero-result point lookups R is determined using Eq. (6). Subsequently, the determined cost of zero-result point lookups R can be plugged into Eq. (5) to acquire the optimal FPRs that minimize point lookup cost with respect to a given memory budget (in step 410).

d) Memory Requirement

As the number of entries N grows relative to the memory budget M, the FPRs increase and eventually converge to one (starting from larger to smaller levels because the FPR at larger levels is higher). Various embodiments identify the ratio of bits per entry M/N at which point the FPR at Level L converges to one by plugging in one for $p_L$ in Eq. (5), plugging the corresponding value of R into Equation 6, and rearranging in terms of M/N:

$$\text{threshold for } \frac{M}{N} = \frac{1}{\ln(2)^2} \cdot \left( \frac{\ln(T)}{T-1} + \frac{\ln(T-1)}{T} \right) \quad (7)$$

Eq. (7) has global maximum of M/N=1.62 bits per entry (which occurs when T is set to 3). For conventional key-value stores used for server applications, the default ratio is an order of magnitude larger (which is typically 10 or 16), and so the FPRs are all lower than one. For systems with less than 1.62 bits per entry (e.g., mobile devices or sensors), lazy leveling described herein may be adapted.

e) Point Lookups for Existing Entries

The worst-case point lookup cost to an existing entry occurs when the target key is at Level L. The expected I/O cost includes one I/O to Level L plus the sum of FPRs across all other levels (i.e., $R-p_L$) and is given in Eq. (8). The cost complexity is O(1) I/Os because the term $R-p_L$ is always less than one as long as the memory requirement in Eq. (7) holds.

$$V = 1 + R - p_L$$

f) Range Lookups

A short range lookup issues at most O(T) I/Os to each of the first L−1 levels and one I/O to the largest level; as a result, the cost complexity is O(1+(L−1) T) I/Os. Note that this expression initially increases as T increases, but as T approaches its limiting value of Turn, this term converges to 1 as the additive term (L−1)·T on the right-hand size becomes zero (i.e., at this point the LSM-tree having lazy leveling merge policy degenerates into a sorted array).

Additionally, a long range lookup may be dominated by sequential access to Level L because it contains exponentially more entries than all other levels. The cost is O(s/B) I/O, where s represents the size of the target key range relative to the size of the existing key space. This is the same as with leveling despite having eliminated most merge operations.

f) Updates

As described above, the new merging policy lazy leveling uses tiering at Levels 1 to L−1 and leveling at Level L, and so an entry participates in O(1) merge operations per level across Levels 1 to L−1 and in O(T) merge operations at Level L. The overall number of merge operations per entry is therefore O(L+T), which may then be divided by the block size B to compute the cost for a single update:

$$O\left(\frac{L+T}{B}\right)$$

since every I/O during a merge operation copies B entries. This is an improvement over the cost with conventional leveling.

f) Space Amplification

In the worst case, every entry at Level 1 to L−1 is an update to an existing entry at Level L. Since the fraction of new entries at Level 1 to L−1 is 1/T of the overall number of entries, space amplification is at most O(1/T) (i.e., if every single entry at smaller levels updates an existing entry at Level L). This is the same bound as with conventional leveling despite having eliminated most merge operations.

Figure 4B:
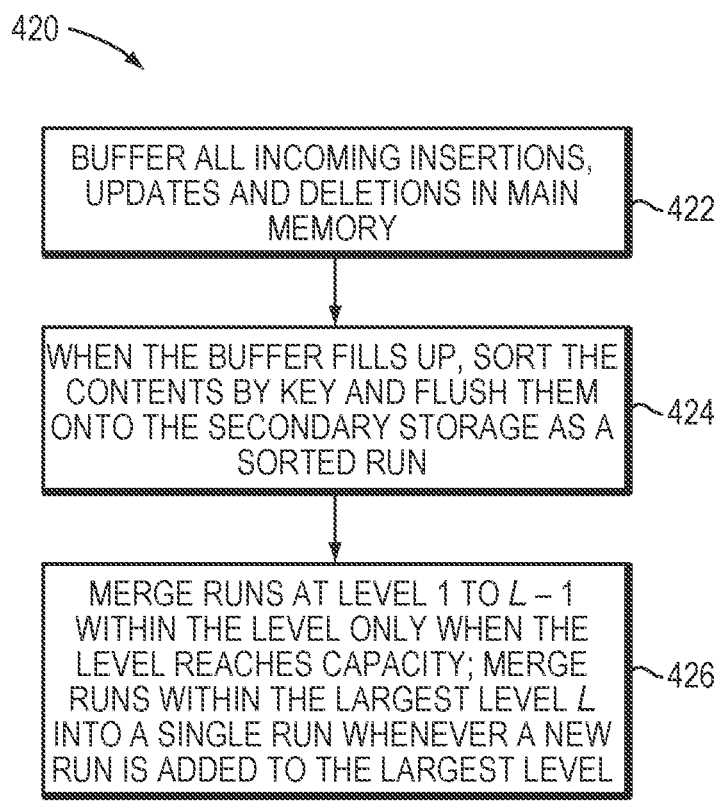
FIG. 4B is a flow chart of an exemplary approach for applying lazy leveling to merge runs in an LSM-tree data structure in accordance with various embodiments.

FIG. 4B is a flow chart of an approach 420 for applying lazy leveling to merge runs in an LSM-tree data structure in accordance herewith. In a first step 422, LSM-tree buffers all incoming insertions, updates and deletions in main memory. When the buffer fills up, its contents are sorted by key and flushed onto the secondary storage (e.g., a disk) as a sorted run; the runs may then be organized into multiple levels according to the run size (in step 424). Runs at Level 1 to L−1 in the secondary storage may be merged within the level only when the level reaches capacity, whereas runs within the largest level L corresponding to the largest run size may be merged into a single run whenever a new run is added to the largest level (in step 426). Utilizing lazy leveling described herein may advantageously improve the cost complexity of updates, maintains the same complexity for point lookups, long range lookups, and space amplification, and provide competitive performance for short range lookups.

Figures 5A, 5B, 5C:
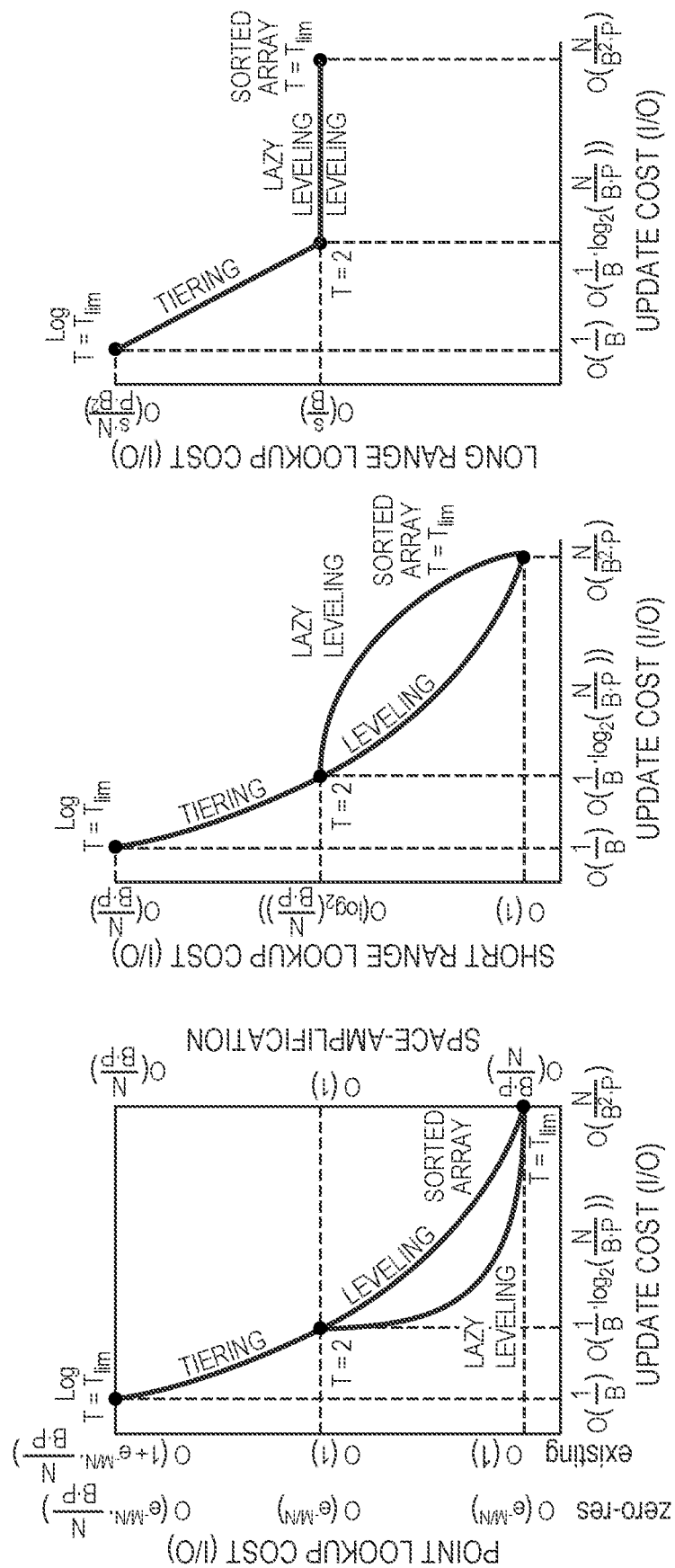
FIGS. 5A-5C depict behavior comparisons among different merge policies in response to a change in a size ratio between adjacent levels in accordance with various embodiments.

FIGS. 5A-5C depict behavior comparisons among different merge policies in response to a change in the size ratio T from 2 to its limit of $T_{lim}$ (i.e., at which point the number of levels drops to one). As shown, the three policies converge in terms of performance characteristics when the size ratio T is set to 2; this is because at this point their behaviors become identical: the number of levels is the same and a merge operation occurs at every level when the second run arrives. In addition, FIG. 5A illustrates that the improvement resulting from lazy leveling achieves for update cost relative to leveling can be traded for point lookup cost by increasing the size ratio. This generates a new trade-off curve between update cost and point lookup cost that dominates leveling, and converges with it again as T approaches $T_{lim}$ (i.e., at which point both merge policies degenerate into a sorted array). FIG. 5B illustrates that the cost of small range lookups is competitive, and FIG. 5C depicts that this cost difference becomes negligible as the target range grows.

Accordingly, no single design may dominate the others universally. While lazy leveling is the best merge policy for combined workloads consisting of updates, point lookups and long range lookups, tiering and leveling are best merge policies for workloads comprising mostly updates or mostly lookups, respectively. As a result, various embodiments switch between and/or combine various merge policies as further described below to strike the optimal balance between the costs of updates and lookups and storage space for different workloads.

2) Improved LSM-Tree (Fluid LSM-Tree)

Various embodiments utilize an improved LSM-tree (sometimes referred to as Fluid LSM-tree) to enable switching between and/or combination of merge policies so as to strike the trade-offs for different workloads. The improved LSM-tree achieves this by controlling the frequency of merge operations separately for the largest level and for all other levels. For example, the improved LSM-tree may fluidly transition from lazy leveling to tiering by merging less frequently at the largest level, or it may transition from lazy leveling to leveling by merging more frequently at all other levels.

a) Basic Structure

Figure 6:
FIG. 6 depicts an exemplary structure of Fluid LSM-tree in accordance with various embodiments.

FIG. 6 illustrates an exemplary structure of Fluid LSM-tree in accordance with various embodiments. As depicted, there are at most Z runs at the largest level and at most K runs at each of the smaller levels. To maintain these bounds, every Level i has an active run into which the incoming runs from Level i−1 are merged. Each active run has a size threshold with respect to the capacity of its level: T/K percent for Levels 1 to L−1 and T/Z percent for Level L. When an active run reaches this threshold, a new active run is started at that level. Ultimately, when a level is at capacity, all runs in it get merged and flushed down to the next level.

b) Fluidity Via Parameterization

The bounds K and Z are used as tuning parameters that enable Fluid LSM-tree to assume the behaviors of different merge policies. For example, K=1 and Z=1 may give leveling; K=T−1 and Z=T−1 may give tiering; and K=T−1 and Z=1 may give lazy leveling. Fluid LSM-tree may transition from lazy leveling to tiering by merging less frequently at the largest level by increasing Z, or it may transition to leveling by merging more frequently at all other levels by decreasing K. Accordingly, various embodiments transition fluidly among these policies by varying the parameters K and Z freely between 1 and T−1.

c) Allocation of Bloom Filters

Various embodiments generalize the optimal FPRs acquired in Eq. (5) with respect to the parameters K and Z. The result is:

$$p_i = \begin{cases} \frac{R}{Z} \cdot \frac{T-1}{T}, & \text{for } i = L \\ \frac{R}{K} \cdot \frac{T-1}{T} \cdot \frac{1}{T^{L-1}}, & \text{for } 1 \leq i < L \end{cases} \quad (9)$$

Eq. (9) generalizes the optimal Bloom filters allocation strategy described in International Application No. PCT/US18/12880 (filed on Jan. 9, 2018, the entire content of which is incorporated herein by reference) across a significantly wider design space. In addition to tiering and leveling, Eq. (9) also includes lazy leveling as well as custom merge policies with any parameter values for K and Z.

d) Zero-Result Point Lookups

In various embodiments, the cost of zero-result point lookups, R, can be modeled by plugging the generalized optimal FPRs in Eq. (9) into Eq. (4), simplifying into closed-form, and rearranging in terms of R. The result is depicted in Eq. (10), and the generalized complexity is $O(1+Z \cdot e^{-M/N})$ I/Os.

$$R = e^{-\frac{M}{N} \cdot \ln(2)^2} \cdot Z^{\frac{T-1}{T}} \cdot K^{\frac{1}{T}} \cdot \frac{T^{\frac{T}{T-1}}}{T-1} \quad (10)$$

e) Point Lookups for Existing Entries

The worst-case lookup cost to an existing key occurs when the target key is at the oldest run at the largest level. The expected I/O cost is one I/O to this target run plus the sum of FPRs across all other runs. In one implementation, Eq. (8) is utilized to model the worst-case lookup cost. In addition, the zero-result point lookup cost, R, from Eq. (10) and FPR at Level L, $p_L$, from Eq. (9) is plugged in Eq. (8); as a result, the generalized cost complexity is $O(1+Z \cdot e^{-MIN})$.

f) Memory Requirement

Further, the memory requirement MIN that guarantees that FPRs across all Levels are lower than one can be derived. In one embodiment, the generalized result is 1.62 bits per entry as described above, which, again, is well below the default ratio in conventional systems.

g) Range Lookups

A short range lookup issues at most K I/Os per level to the smaller L−1 Levels and at most Z I/Os to the largest level for a total of Z+K·(L−1) random I/Os and a cost complexity of O(Z+K·(L−1)). A long range lookup continues with a sequential scan to the relevant key range at each run spanning at least s/B sequential I/Os, where s is the number of unique entries in the target key range.

To account for obsolete entries, the number of sequential I/Os may be amplified by a factor of 1+1/T for updated entries at Levels 1 to L−1 and Z for updated entries at Level L, which are modeled together as Z+1/T. The sequential scan cost is therefore at most $$\frac{s}{B}\left(Z + \frac{1}{T}\right)$$

I/Os with a complexity of $$O\left(\frac{s \cdot Z}{B}\right) \text{I/Os.}$$

The generalized range lookup cost is the sum of costs for short and long range lookups, given in Eq. (11). Note that a constant µ may be added to weight sequential access by an amount by which it is faster than random access on storage devices (e.g., disks).

$$Q = K \cdot (L-1) + Z + s \cdot \frac{s \cdot N}{\mu \cdot B} \cdot \frac{K + Z \cdot (T-1)}{T} \quad (11)$$

g) Updates

In the worst case, an entry participates in O(T/K) merge operations within an active run across each of Levels 1 to L−1, and in O(T/Z) merge operations within the active run at Level L. The overall update cost W is the sum of these terms across all levels divided by the block size:

$$O\left(\frac{T}{B} \cdot \left(\frac{L}{K} + \frac{1}{Z}\right)\right).$$

In various embodiments, this cost is modeled more precisely using arithmetic series to obtain Eq. (12). The update cost is divided by the constant µ since the cost of updates is incurred through sequential merge operations. In addition, an additional constant φ may be introduced to account for the property of some storage devices that writes are more expensive than reads (e.g., flash).

$$W = \frac{\phi}{\mu \cdot B} \cdot \left(\frac{T-1}{K+1} \cdot (L-1) + \frac{T-1}{Z+1}\right) \quad (12)$$

h) Space Amplification

Levels 1 to L−1 contain 1/T percent of the dataset size, and so they may render up to this fraction of entries obsolete at the largest level. In Level L, at most Z−1 of the runs may be completely filled with obsolete entries. As a result, space amplification may be modeled as the sum of these terms given in Eq. (13):

$$amp = Z - 1 + \frac{1}{T} \quad (13)$$

h) Mapping the Design Space

Figure 7:
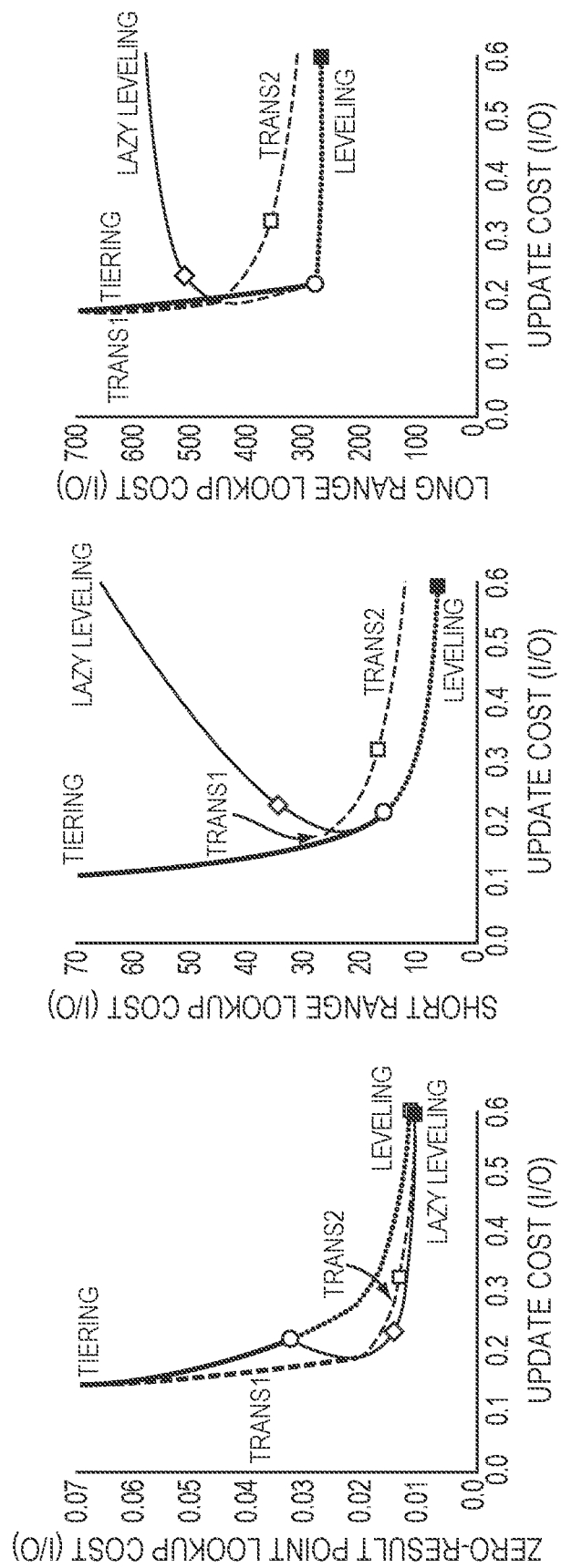
FIGS. 7A-7C illustrate an improved LSM-tree fluidly shifting between lazy leveling, leveling and tiering in accordance with various embodiments.

FIGS. 7A-7C map the different trade-offs available with Fluid LSM-tree based on the cost models described above. As depicted, the Fluid LSM-tree may fluidly shift between lazy leveling, leveling and tiering so as to optimize more for range lookups vs. point lookups and updates, respectively. FIG. 7A is generated by plotting the point lookup cost R in Eq. (10) against update cost W in Eq. (12). FIGS. 7 B and 7C are generated for short- and long-range lookups by plotting Q in Eq. (11) against update cost W in Eq. (12) for selectivities s of $10^7$ and $10^6$, respectively. The curves for leveling, tiering, and lazy leveling are generated using their corresponding fixed values for the parameters K and Z, and varying the size ratio T. The circle in each figure indicates the convergence point of all three merge policies when the size ratio T is set to two. The squares indicate a size ratio of ten (which is used in most conventional key-value stores) for enabling comparison of corresponding points across FIGS. 7A-7C.

As shown, FIGS. 7A-7C include two transition curves, Trans1 and Trans2, to demonstrate how Fluid LSM-tree may transition fluidly from lazy leveling to tiering or leveling, respectively, and achieving trade-offs that would not have been possible using a fixed merge policy as implemented in conventional approaches.

Transition 1 (Trans1): Lazy Leveling to Tiering

FIG. 7A depicts that the curve for lazy leveling has an inflection point; beyond the inflection point, decreasing the size ratio may degrade the update cost. The reason is that update cost is $$O\left(\frac{L+T}{B}\right),$$

and as T decreases, the value of L grows and comes to dominate T. In this example, the inflection point occurs when the size ratio T is set to 5. In FIG. 7A, the curve "Trans1" is generated by fixing T to the inflection point value and instead varying Z from 1 to T−1 (e.g., 4 in this example). Trans1 curve dominates both lazy leveling and tiering for this part of the design space until it converges with tiering. Thus, Transition 1 enables optimal trade-offs between point lookup cost and update cost as Fluid LSM-tree transitions between lazy leveling and tiering to optimize more for point lookups or updates, respectively.

Transition 2 (Trans2): Lazy Leveling to Tiering

Referring to FIGS. 7B and 7C, leveling may dominate lazy leveling for range-lookups by a rapidly increasing margin for short range lookups (as shown in FIG. 7B) and by a constant margin for long range lookups (as shown in FIG. 7C). In order to achieve good update cost and point lookup cost as with lazy leveling while getting even more competitive range lookup costs, in various embodiments, "Transition 2" is introduced. Various embodiments vary K, the bound on the number of runs at Levels 1 to L−1, between 1 and T−1 to fluidly transition between lazy leveling and leveling. The curve "Trans2" is generated by fixing K to 4 and varying T FIG. 7A depicts that this enables navigating a trade-off curve similar to lazy leveling, and FIGS. 7B and 7C illustrate that Trans2 achieves nearly the same range lookup cost as with leveling. Thus, Transition 2 may provide fine control over how much short range lookups may be optimized for.

Figure 8:
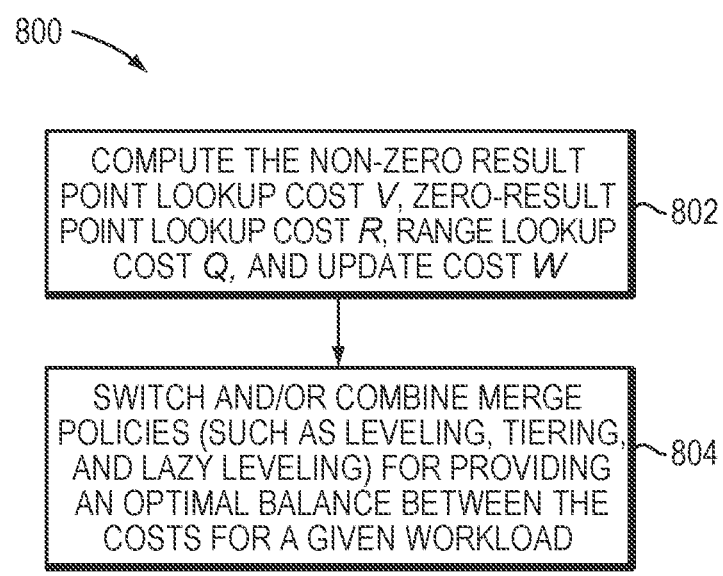
FIG. 8 is a flow chart of an exemplary approach for implementing an improved LSM-tree to enable switching between and/or combination of various merge policies in accordance with various embodiments.

FIG. 8 is a flow chart of an approach 800 for utilizing an improved LSM-tree to enable switching between and/or combination of various merge policies in accordance with various embodiments. In a first step 802, the non-zero result point lookup cost V, zero-result point lookup cost R, range lookup cost Q, and update cost W, are computed using Eqs. (8) (10), (11) and (12), respectively. Generally, the update cost specifies an I/O cost of modifying a file in the secondary storage or the file buffer and the lookup cost specifies a cost of retrieving a file from the secondary store or the file buffer. For example, the point lookups may find the most recent version of a key-value pair in the secondary storage or in one of the runs; and the range lookups may find the most recent version of key-value pairs within a range in the secondary storage or in the main memory. Based on the computed point lookup cost, range lookup cost and update cost, Fluid LSM-tree may switch between and/or combine merge policies, such as leveling, tiering, and lazy leveling for improving performance. For example, compared with lazy leveling, Fluid LSM-tree may improve optimization for updates (e.g., by merging less at the largest level L) and range lookups (e.g., by merging more at levels 1 to L−1) (in step 804).

3) Combining Lazy Leveling with the Improved LSM-Tree

The space of optimal performance trade-offs is delineated by leveling, lazy leveling, and tiering, and many other performance trade-offs in-between these policies may be reached by co-tuning the parameters K, Z and T In various embodiments, the goal is to co-tune these parameters, thereby striking the best trade-off for a particular application and/or deciding when to adapt one but not both of these approaches.

One approach to combining lazy leveling with Fluid LSM-tree is to model and optimize throughput with respect to update cost W in Eq. (12), zero-result point lookup cost R in Eq. (10), non-zero result point lookup cost V in Eq. (8), and range lookup cost Q in Eq. (11), monitoring the proportion of these operations in the workload and weights their costs using coefficients w, r, v, and q, respectively. This weighted cost may be multiplied by the time to read a block from storage, $\Omega$ and taking the inverse to obtain the weighted worst-case throughput $\tau$:

$$\tau = \Omega^{-1} \cdot (w \cdot W + r \cdot R + v \cdot V + q \cdot Q)^{-1} \quad (14)$$

Eq. (14) may be maximized by iterating over different values of the parameters T, K, and Z. In this approach, the search space is pruned using two insights. The first is that LSM-tree has at most $L_{max}$ levels, each of which has a corresponding size ratio T, and so there are only $$\left\lfloor \log_2\left(\frac{N}{P \cdot B}\right) \right\rfloor$$

meaningful values of T to test. The second insight is that the lookup costs R, Q and V increase monotonically with respect to K and Z, whereas update cost W decreases monotonically with respect to them. As a result, Eq. (14) is convex with respect to both K and Z; various embodiments can then divide and conquer their value spaces and converge to the optimum with logarithmic runtime complexity. Overall, auto-tuning may take $$O\left(\log_2\left(\frac{N}{P \cdot B}\right)^3\right)$$

iterations as each parameter contributes one multiplicative log factor to runtime. To satisfying a given constraint on space amplification, tunings for which Eq. (13) is above the constraint may be ignored. In addition, since various embodiments iterate over a closed-form model, execution typically takes a fraction of a second, making it possible to find the optimal tuning at runtime without affecting overall system performance. Auto-tuning may be invoked every time the buffer flushes, and any new values of T, K and Z may be adapted to a level after the next time it flushes. Alternatively, auto-tuning may be invoked between time windows having a predetermined number (e.g., 16) of buffer flushes.

Figure 9:
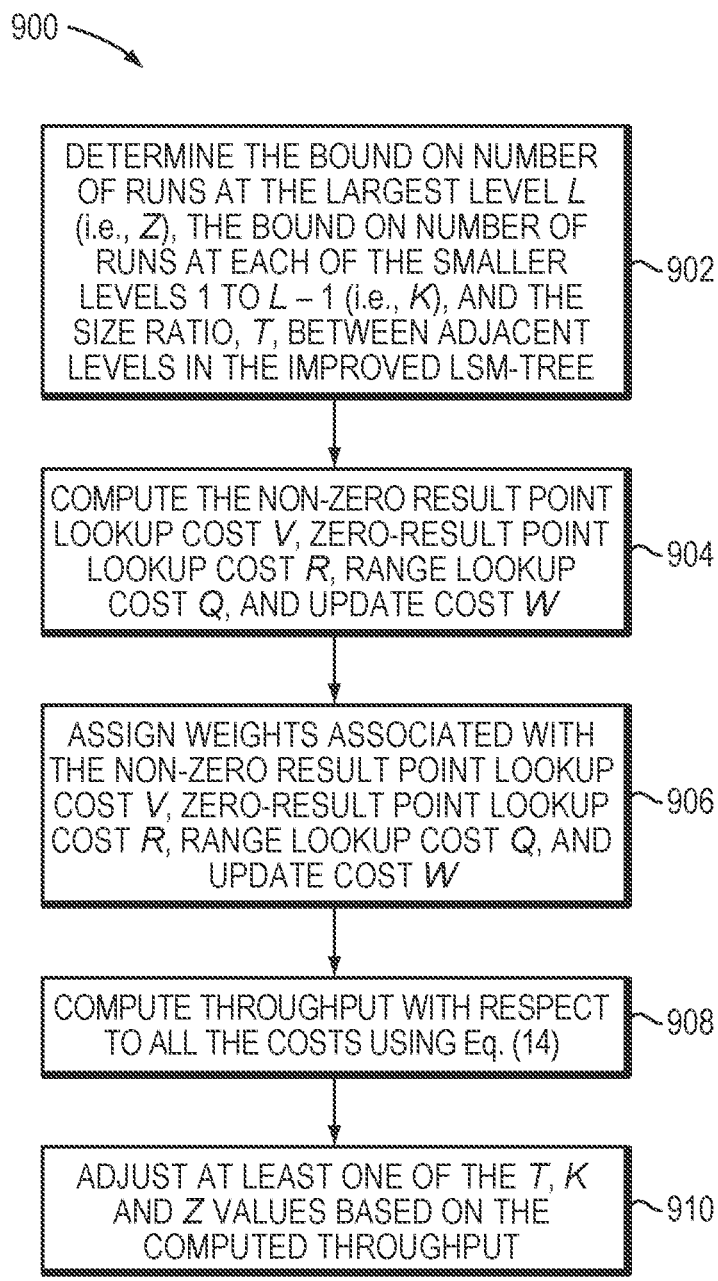
FIG. 9 is a flow chart of an exemplary approach for combining lazy leveling with the improved LSM-tree to strike an optimal balance between the costs of updates and lookups for a workload and hardware in accordance with various embodiments.

FIG. 9 is a flow chart of an approach 900 for combining lazy leveling with the improved LSM-tree to strike an optimal balance between the costs of updates and lookups for a workload and hardware in accordance with various embodiments. In a first step 902, the bound on a number of runs at the largest level L (i.e., Z), the bound on a number of runs at each of the smaller levels 1 to L−1 (i.e., K), and the size ratio, T, between adjacent levels in the improved LSM-tree are predetermined. In a second step 904, the non-zero result point lookup cost V, zero-result point lookup cost R, range lookup cost Q, and update cost W, are computed using Eqs. (8) (10), (11) and (12), respectively. In a third step 906, the proportion of these operations in the workload is monitored and based thereon, weights associated with the costs are assigned. In a fourth step 908, throughput with respect to all the costs is computed using the costs acquired in step 904 and their associated weights assigned in step 906. In one implementation, the time to read a block from the secondary storage is taken into account when computing the throughput. In a fifth step 910, based on the computed throughput, at least one of the T, K and Z values is adjusted. In one embodiment, adjustments of the values for T, K and Z is constrained by a maximum amount of storage space that may be occupied by obsolete files. Steps 904-910 may be iteratively performed until the throughput is maximized.

Figures 10A, 10B:
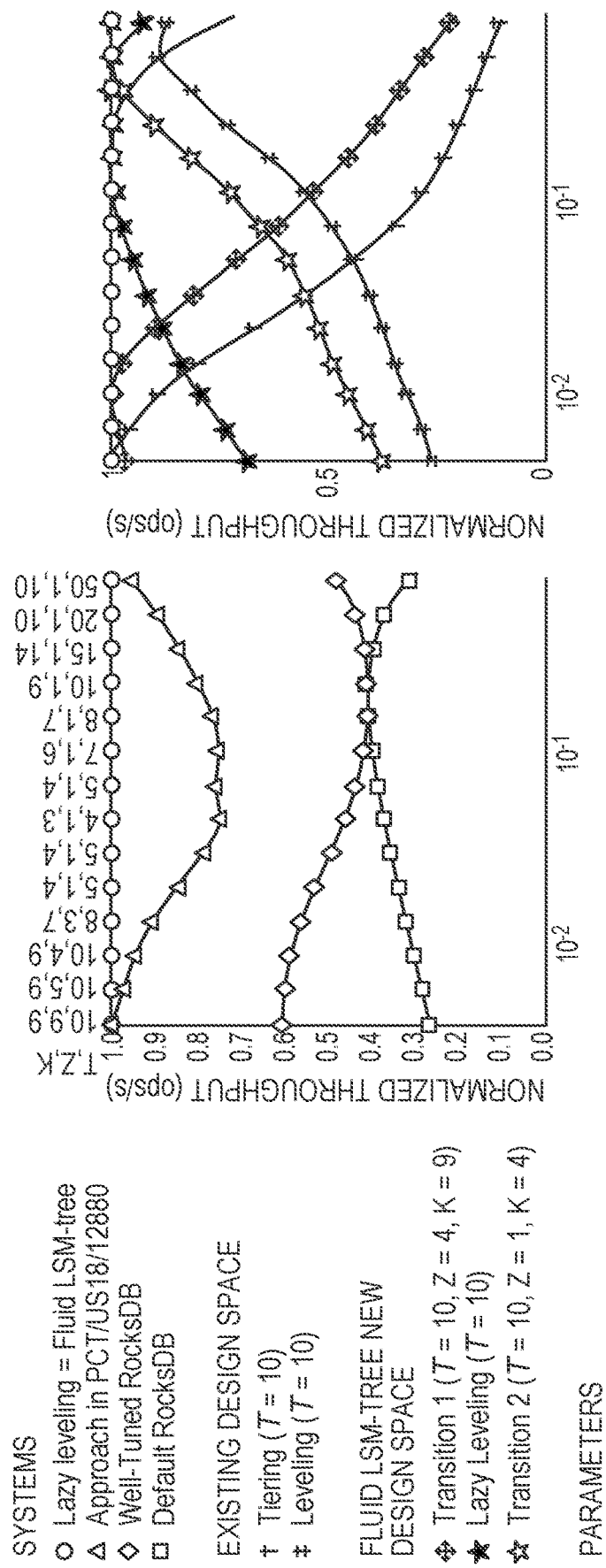
Figures 10C, 10D:
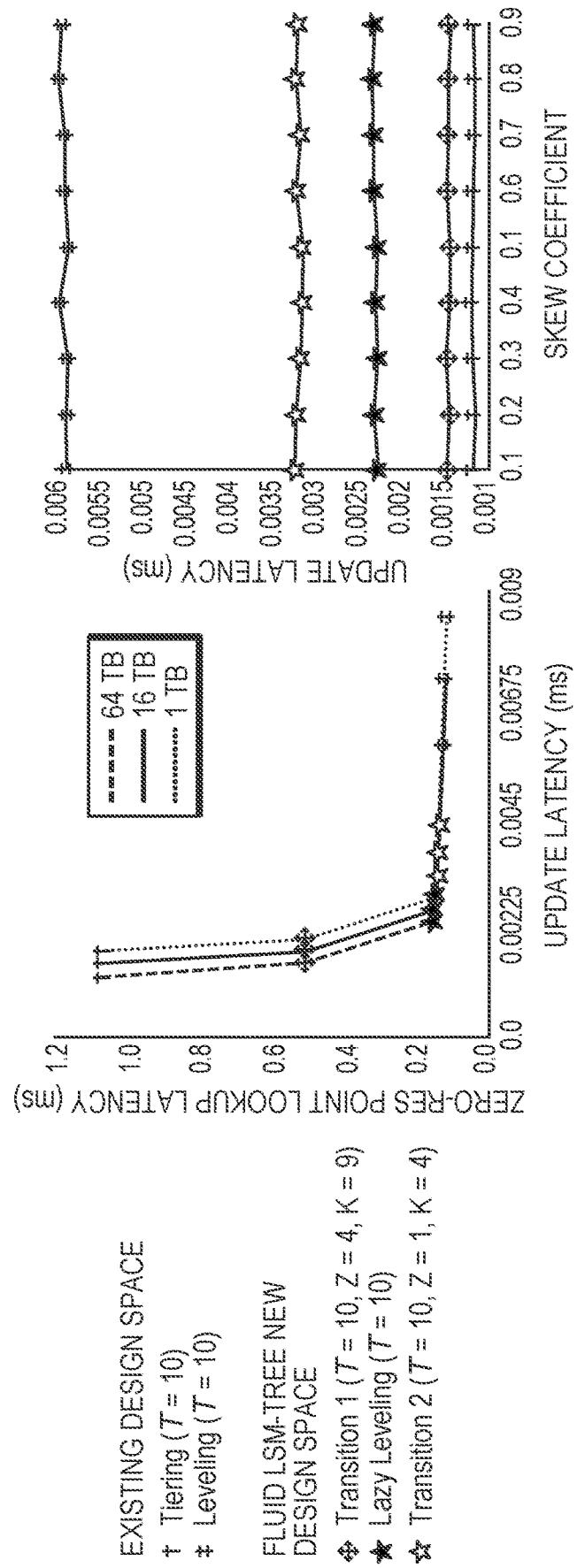
Figure 10H:
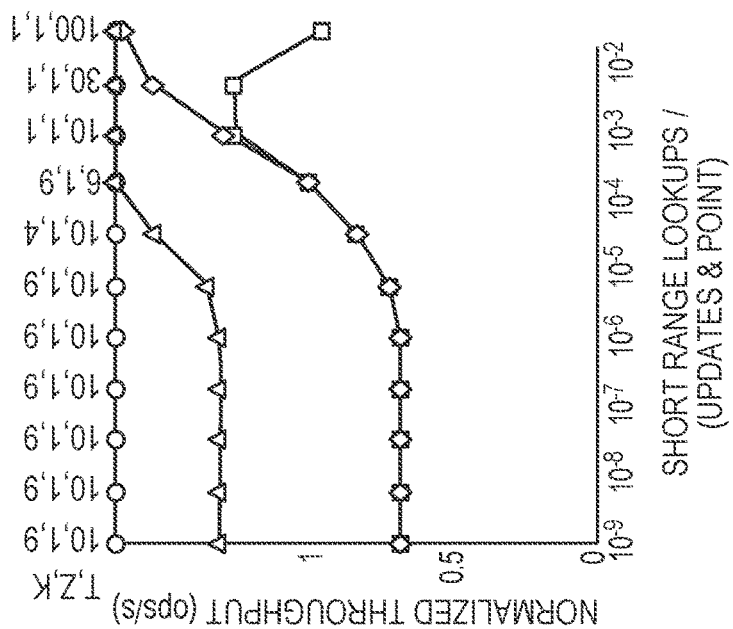
Figure 10G:

FIGS. 10A-10H depict performance comparisons of implementing a combination of lazy leveling with Fluid LSM-tree and conventional LSM-tree-based systems. FIG. 10A illustrates that the combination of lazy leveling and Fluid LSM-tree as described herein dominates the conventional systems; this is because the combined approach enables better cost trade-offs for combined workloads. FIG. 10B illustrates that the combined approach dominates all fixed merge policies; this is because the combined approach may encompass all of the merge policies and fluidly transition among them. FIG. 10C illustrates that the combined approach offers increasingly better performance relative to conventional systems as the data size grows; thus the combined approach is more scalable. FIG. 10D illustrates that the improved update cost offered by the combined approach by extension is robust across a wide range of temporal update skews. FIG. 10E illustrates that the combined approach achieves robust point lookup performance across a wide range of memory budgets. FIG. 10F illustrates that the combined approach may achieve a given bound on space amplification while paying a lower toll in terms of update cost due to merging. FIGS. 10G and 10H illustrate that the combined approach may transition among various merge policies, thereby maximizing throughput and dominating the conventional system. Accordingly, this combined approach offers richer space-time trade-offs by merging as little as possible to achieve given bounds on lookup cost and space, and facilitates determination of the optimal trade-off for a particular application workload and hardware.

Representative Architecture

Figure 11:
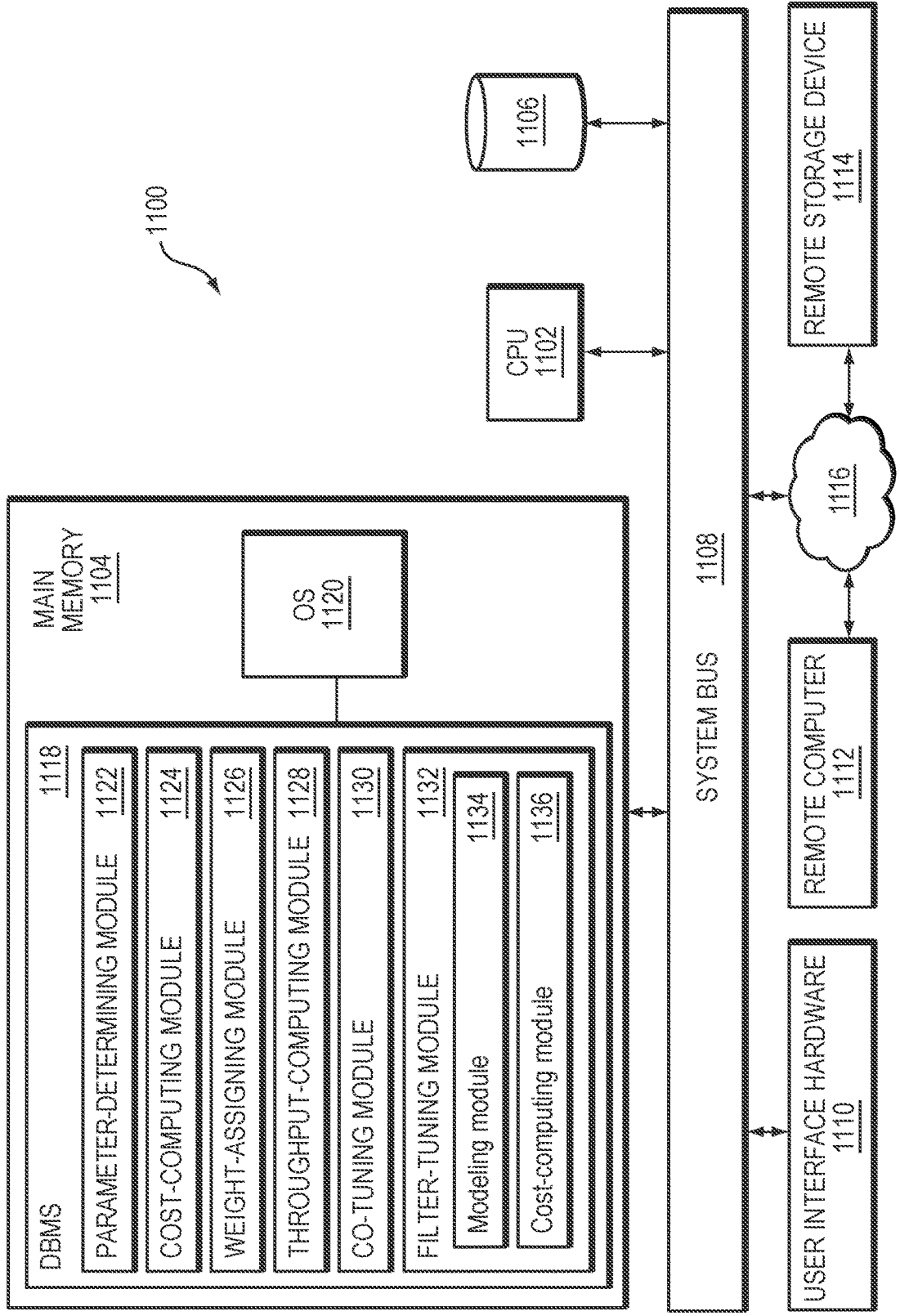
FIG. 11 is a block diagram illustrating a facility for performing an improved key-value approach using a combination of lazy leveling and Fluid LSM-tree in accordance with various embodiments.

Approaches for achieving an optimal balance between the costs of updates and lookups for a particular workload and hardware in accordance herewith can be implemented in any suitable combination of hardware, software, firmware, or hardwiring. FIG. 11 illustrates an exemplary embodiment utilizing a suitably programmed general-purpose computer 1100. The computer includes a central processing unit (CPU) 1102, at least a main (volatile) memory 1104 having a file buffer and multiple Bloom filters, each associated with a memory access run, and non-volatile mass storage devices 1106 (such as, e.g., one or more hard disks and/or optical storage units) for storing various types of files. The computer 1100 further includes a bidirectional system bus 1108 over which the CPU 1102, main memory 1104, and storage devices 1106 communicate with each other and with internal or external input/output devices, such as traditional user interface components 1110 (including, e.g., a screen, a keyboard, and a mouse) as well as a remote computer 1112 and/or a remote storage device 1114 via one or more networks 1116. The remote computer 1112 and/or storage device 1114 may transmit any information (e.g., keys and/or values associated with various applications) to the computer 1100 using the network 1116.

In some embodiments, the computer 1100 includes a database management system (DBMS) 1118, which itself manages reads and writes to and from various tiers of storage, including the main memory 1104 and secondary storage devices 1106. The DBMS 1118 establishes, and can vary, operating parameters including the size ratio, T, among levels, the bound on a number of runs, Z, at the largest level L, the bound on a number of runs, K, at each of the smaller levels 1 to L−1, the merge policy, the FPR assigned to Bloom filters across different levels, and the allocation of main memory between the buffer and the filters as described above. The DBMS 1118 may be implemented by computer-executable instructions (conceptually illustrated as a group of modules and stored in main memory 1104) that are executed by the computer 1100 so as to control the operation of CPU 1102 and its interaction with the other hardware components.

In addition, an operating system 1120 may direct the execution of low-level, basic system functions such as memory allocation, file management and operation of the main memory 1104 and/or mass storage devices 1106. At a higher level, one or more service applications provide the computational functionality required for implementing the improved key-value approaches using a combination of lazy leveling and Fluid LSM-tree described herein. For example, as illustrated, upon receiving a query from a user via the user interface 1110 and/or from an application in the remote computer 1112 and/or the computer 1100, the system 1120 may assess the main memory 1104 and/or secondary storage devices 1106 to look up the target key as described above. Upon finding the target key, the system 1120 may assess the data that is identified by the target key; the data may be stored in a database (not shown) associated with the main memory 1104, secondary storage devices 1106, remote computer 1112 and/or remote storage device 1114. To speed up the lookup process using the improved LSM-based approaches described above, in various embodiments, a parameter-determining module 1122 first determines the values of Z, K and T in the improved LSM-tree as described in step 902. A cost-computing module 1124 may then compute the non-zero result point lookup cost V, zero-result point lookup cost R, range lookup cost Q, and update cost W using the determined values of Z, K and T and Eqs. (8), (10), (11) and (12), respectively, as described in step 904. In addition, a weight-assigning module 1126 may monitor the proportion of these operations in the workload and, based thereon, assign weights to the costs as described in step 906. In one embodiment, the DBMS includes a throughput-computing module 1128 that can compute throughput with respect to all costs, including the non-zero result point lookup cost V, zero-result point lookup cost R, range lookup cost Q, and update cost W, using Eq. (14) as described in step 908. A co-tuning module 1130 may then be implemented to tune the values of Z, K and T so as to optimize throughput for the workload and/or favor one performance metric over another as described in step 910. In one embodiment, adjustments of the values for T, K and Z is constrained by a maximum amount of storage space that may be occupied by obsolete files.

In some embodiments, the DBMS further includes a filter-tuning module 1132 that may tune the Bloom filters across various levels differently to minimize the point lookup cost with respect to a given memory budget. For example, the filter-tuning module 1132 may include a modeling module 1134 to model the worse-case expected number of wasted I/Os per lookup using Eq. (3) and the memory footprint for the Bloom filters at each level and the memory footprint across all levels using Eq. (4) as described in steps 402, 404. The modeling module 1134 may optimize the two models with respect to each other. In one embodiment, the filter-tuning module 1132 includes a cost-computing module 1136 to compute the cost of zero-result point lookups using Eq. (6) as described in step 406. Based on the determined cost of zero-result point lookups, the filter-tuning module 1132 may acquire the optimal FPRs that minimize point lookup cost with respect to a given memory budget as described in step 410. In some embodiments, the filter-tuning module 1132 may generalize the acquired optimal FPRs with respect to the parameters K and Z.

Generally, program modules 1122-1136 include routines, programs, objects, components, data structures, etc. that performs particular tasks or implement particular abstract data types. Those skilled in the art will appreciate that the invention may be practiced with various computer system configurations, including multiprocessor systems, microprocessor-based or programmable consumer electronics, mini-computers, mainframe computers, and the like. The invention may also be practiced in distributed computing environments where tasks are performed by remote processing devices that are linked through a communications network. In a distributed computing environment, program modules may be located in both local and remote computer-storage media including memory storage devices.

In addition, the CPU 1102 may comprise or consist of a general-purpose computing device in the form of a computer including a processing unit, a system memory, and a system bus that couples various system components including the system memory to the processing unit. Computers typically include a variety of computer-readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

The CPU 1102 that executes commands and instructions may be a general-purpose processor, but may utilize any of a wide variety of other technologies including special-purpose hardware, a microcomputer, mini-computer, mainframe computer, programmed micro-processor, micro-controller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), smart chip, or any other device or arrangement of devices that is capable of implementing the steps of the processes of the invention.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

More generally, the computer shown in FIG. 11 is representative only and intended to provide one possible topology. It is possible to distribute the functionality illustrated in FIG. 11 among more or fewer computational entities as desired. The network 1116 may include a wired or wireless local-area network (LAN), wide-area network (WAN) and/or other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI, for example. For wireless communications, communications protocols may include the cellular telecommunications infrastructure, WiFi or other 802.11 protocol, Bluetooth, Zigbee, IrDa or other suitable protocol. Furthermore, components of the system may communicate through a combination of wired or wireless paths.

Any suitable programming language may be used to implement without undue experimentation the analytical functions described within. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of the system and method of the invention. Rather, any number of different programming languages may be utilized as is necessary or desirable.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A database system comprising:
a main memory;
a secondary store comprising nonvolatile storage;
memory containing a log-structured merge-tree (LSM-tree) providing indexed access to files stored in the file buffer and the secondary store, the LSM-tree being organized to accommodate a range of merge policies; and
a processor for accessing runs in the main memory, each of the runs including a plurality of key-value pairs sorted by key, wherein:
(i) each of the runs is sorted and has a size;
(ii) the runs are organized into a plurality of levels according to run size; and
(iii) the processor is configured to select a merge policy from a plurality of alternatives and operate the LSM-tree in accordance with the selected merge policy, the merge policy determining a frequency of merging runs within each of the LSM-tree levels.

2. The system of claim 1, wherein the processor is further configured to select a merge policy based on comparison of an update cost with a lookup cost, the update cost specifying a I/O cost of modifying a file in the secondary store or the file buffer and the lookup cost specifying a cost of retrieving a file from the secondary store or the file buffer.

3. The system of claim 2, wherein the lookups are point lookups that find a most recent version of a key-value pair in the secondary store or in one of the runs.

4. The system of claim 2, wherein the lookups are range lookups that find a most recent version of key-value pairs within a range in the secondary store or in the main memory.

5. The system of claim 2, wherein the merge policy specifies a frequency of merge operations within each of the levels.

6. The system of claim 5, wherein the processor is further configured to select a storage capacity for each of the levels, the storage capacities having sizes conforming to a unitary size ratio between successive levels that dictates a frequency at which a level fills up and spills to another level.

7. The system of claim 6, wherein:
(i) a largest one of the levels has a storage capacity of Z runs;
(ii) the other levels have a storage capacity of K runs;
(iii) the unitary size ratio is T;
(iv) K=T−1 and Z=1; and
(v) Z, K, and T are integers greater than 1.

8. The system of claim 6, wherein:
(i) a largest one of the levels has a storage capacity of Z runs;
(ii) the other levels have a storage capacity of K runs;
(iii) the unitary size ratio is T;
(iv) 1<K≤T−1 and 1<Z≤T−1; and
(v) Z, K, and T are integers greater than 1.

9. A method for providing an improved key-value storing system, the method comprising:
providing a main memory;
providing a secondary store comprising nonvolatile storage;
providing memory containing a log-structured merge-tree (LSM-tree) having indexed access to files stored in the file buffer and the secondary store, the LSM-tree being organized to accommodate a range of merge policies;
accessing runs in the main memory, each of the runs including a plurality of key-value pairs sorted by key, wherein (i) each of the runs is sorted and has a size and (ii) the runs are organized into a plurality of levels according to run size; and
selecting a merge policy from a plurality of alternatives and operate the LSM-tree in accordance with the selected merge policy, the merge policy determining a frequency of merging runs within each of the LSM-tree levels.

10. The method of claim 9, further comprising selecting a merge policy based on comparison of an update cost with a lookup cost, the update cost specifying a I/O cost of modifying a file in the secondary store or the file buffer and the lookup cost specifying a cost of retrieving a file from the secondary store or the file buffer.

11. The method of claim 10, wherein the lookups are point lookups that find a most recent version of a key-value pair in the secondary store or in one of the runs.

12. The method of claim 10, wherein the lookups are range lookups that find a most recent version of key-value pairs within a range in the secondary store or in the main memory.

13. The method of claim 10, wherein the merge policy specifies a frequency of merge operations within each of the levels.

14. The method of claim 13, further comprising selecting a storage capacity for each of the levels, the storage capacities having sizes conforming to a unitary size ratio between successive levels that dictates a frequency at which a level fills up and spills to another level.

15. The method of claim 14, wherein:
(i) a largest one of the levels has a storage capacity of Z runs;
(ii) the other levels have a storage capacity of K runs;
(iii) the unitary size ratio is T;
(iv) K=T−1 and Z=1; and
(v) Z, K, and T are integers greater than 1.

16. The method of claim 14, wherein:
a largest one of the levels has a storage capacity of Z runs;
(ii) the other levels have a storage capacity of K runs;
(iii) the unitary size ratio is T;
(iv) 1<K≤T−1 and 1<Z≤T−1; and
(v) Z, K, and T are integers greater than 1.

17. A database system comprising:
a main memory having an associated storage cost;
a secondary store comprising nonvolatile storage and having an associated storage cost higher than that of the main memory;
memory containing a log-structured merge-tree (LSM-tree) providing indexed access to files stored in the main memory and in the secondary store; and
a processor for accessing runs in the main memory, each of the runs including a plurality of key-value pairs sorted by key, wherein:
(i) each of the runs is sorted and has a size;
(ii) the runs are organized within the secondary store into a plurality of levels according to run size; and
(iii) the processor is configured to merge all runs within a largest level corresponding to the largest run size into a single run whenever a new run is added to the largest level and at every other level merging runs only from lower levels.

18. The system of claim 17, wherein the processor is further configured to perform updates to memory contents, point lookups to find a most recent version of a stored key-value pair, and range lookups to find a most recent version of all stored key-value pairs within a target key range.

19. The system of claim 18, wherein the main memory further comprises a plurality of Bloom filters each associated with a run, the processor being further configured to allocate a memory budget among the Bloom filters to minimize an I/O cost of point lookups.

20. The system of claim 19, wherein the processor is further configured to assign a false positive rate to the Bloom filter at each level based at least in part on a number of entries in the corresponding run, and minimize the point-lookup cost by (i) defining a memory budget, (ii) determining false positive rates of the Bloom filters that minimize the point-lookup cost given the defined memory budget, and (iii) assigning the determined false positive rates to the Bloom filters.

21. A method for providing an improved key-value storing system, the method comprising:
providing a main memory having an associated storage cost;
providing a secondary store comprising nonvolatile storage and having an associated storage cost higher than that of the main memory;

providing memory containing a log-structured merge-tree (LSM-tree) having indexed access to files stored in the main memory and in the secondary store;

accessing runs in the main memory, each of the runs including a plurality of key-value pairs sorted by key, wherein (i) each of the runs is sorted and has a size and (ii) the runs are organized within the secondary store into a plurality of levels according to run size; and merging all runs within a largest level corresponding to the largest run size into a single run whenever a new run is added to the largest level and at every other level merging runs only from lower levels.

22. The method of claim 21, further comprising performing updates to memory contents, point lookups to find a most recent version of a stored key-value pair, and range lookups to find a most recent version of all stored key-value pairs within a target key range.

23. The method of claim 21, wherein the main memory further comprises a plurality of Bloom filters each associated with a run, the method further comprising allocating a memory budget among the Bloom filters to minimize an I/O cost of point lookups.

24. The method of claim 23, further comprising assigning a false positive rate to the Bloom filter at each level based at least in part on a number of entries in the corresponding run, and minimizing the point-lookup cost by (i) defining a memory budget, (ii) determining false positive rates of the Bloom filters that minimize the point-lookup cost given the defined memory budget, and (iii) assigning the determined false positive rates to the Bloom filters.

* * * * *